US008117052B2

(12) United States Patent
Chung et al.

(10) Patent No.: US 8,117,052 B2
(45) Date of Patent: Feb. 14, 2012

(54) MULTI-TIER CROSS-DEPARTMENT SCHEDULING MODEL FOR ORDER PROCESSING OPERATIONS

(75) Inventors: Casey Chung, McKinney, TX (US); Chelliah Sriskandarajah, Plano, TX (US)

(73) Assignee: Distribution Planning Horizons LLC, Plano, TX (US)

( * ) Notice: Subject to any disclaimer, the term of this patent is extended or adjusted under 35 U.S.C. 154(b) by 1087 days.

(21) Appl. No.: 11/866,484

(22) Filed: Oct. 3, 2007

(65) Prior Publication Data

US 2009/0094087 A1 Apr. 9, 2009

(51) Int. Cl.
*G06Q 10/00* (2012.01)
(52) U.S. Cl. ............................ 705/7.11; 705/7.12
(58) Field of Classification Search .......... 705/7.11
See application file for complete search history.

(56) References Cited

U.S. PATENT DOCUMENTS

| 5,093,794 | A | 3/1992 | Howie et al. | |
|---|---|---|---|---|
| 6,564,113 | B1 | 5/2003 | Barto et al. | |
| 2005/0187646 | A1 | 8/2005 | Wen et al. | |
| 2006/0173749 | A1* | 8/2006 | Ward et al. | 705/26 |
| 2006/0224423 | A1 | 10/2006 | Sun et al. | |
| 2006/0294235 | A1* | 12/2006 | Joseph | 709/225 |
| 2007/0091355 | A1* | 4/2007 | Rai | 358/1.15 |

FOREIGN PATENT DOCUMENTS

WO  WO 02099345 A1 * 12/2002

OTHER PUBLICATIONS

Newman, Alexandra M.; Yano, Candace Arai; "Centralized and decentralized train scheduling for intermodal operations" : IIE Transactions, vol. 32, No. 8; Aug. 2000; pp. 743+. from DIALOG.*
Agnetis, A., P.B. Mirchandani, D. Pacciarelli, A. Pacifici, "Scheduling Problems with Two Competing Agents," Operations Research, 2004, 52 229-242.
Brown, G.G., Dell, R.F., Davis, R.L., Duff, R.H., "Optimizing Plant-Line Schedules and an Application at Hidden Valley Manufacturing Company," Interfaces, 2002, 32 1-14.
Chen, Z., Pundoor, G., "Order Assignment and Scheduling in a Supply Chain, Operations Research," 2006, 54 555-572.
Chen, Z., Vairaktarakis, G.L., "Integrated Scheduling of Production and Distribution Operations," Management Science, 2005, 51 614-628.
Dobson, G., R.S. Nambimadom, "The Batch Loading and Scheduling Problem," Operations Research, 2001, 49 52-65.
Forger, G., "Just the Ticket for Blockbuster," Modern Material Handling, 2005, 60 22-26.

(Continued)

*Primary Examiner* — John Hayes
*Assistant Examiner* — David J Clark
(74) *Attorney, Agent, or Firm* — Smith IP Services P.C.

(57) ABSTRACT

A multi-tier cross-department scheduling model for order processing operations. A scheduling model for planning assignment of discrete jobs to multiple departments for shipment, wherein selected jobs are assignable to respective selected departments and the departments share finite capacity resources, includes a programmable computer system having loaded therein an objective function, and the computer system being operable to minimize a value of the objective function; and wherein the objective function comprises a sum of cost to ship containers in at least one of consolidated and unconsolidated forms, cost for each of a container equivalent not completed in a selected scheduling horizon, cost to process each job in each department, and cost for setup due to at least one of shift crossing and job splitting.

8 Claims, 7 Drawing Sheets

OTHER PUBLICATIONS

Fourer, R.D., Kernighan G.B., AMPL: A Modeling Language for Mathematical Programming, second edition. Duxbury Press/Brooks Cole Publishing, Pacific Grove, California, 2003.

Graves, S. C., "A Review of Production Scheduling," Operations Research, 1981, 29 646-675.

ILOG CPLEX 10.0 user's manual. ILOG S.A., Gentilly Cedex, France, 2006.

Keskinocak, P., Wu, F., Goodwin, R., Murthy, S., Akkiraju, S., Kumaran, S., Derbail, A., "Scheduling Solutions for the Paper Industry," Operations Research, 2002, 50 249-259.

Kuchta, M., Newman, A., Topal, "Implementing a Production Schedule at LKAB's Kiruna Mine," Interfaces, 2004, 34 124-134.

Lee, H., Pinto, J.M., Grossman, I.E., Park, S., "Mixed-Integer Linear Programming Model for Refinery Short-Term Scheduling of Crude Oil Unloading with Inventory Management," Industrial and Engineering Chemistry Research, 1996, 35 1630-1641.

Moss, S., Dale, C., Brame, G., "Sequence-Dependent Scheduling at Baxter International," Interfaces, 2000, 30 70-80.

Olson, J.R., Schniederjans, M.J., "A Heuristic Scheduling System for Ceramic Industrial Coatings," 2000, Interfaces, 30 16-22.

Pinedo, M., Scheduling: Theory, Algorithms and Systems, second edition. Prentice-Hall, Upper Saddle River, New Jersey 2002.

Pinto, J.M., Grossman, I.E., "Assignment and Sequencing Models for the Scheduling of Process Systems," Annals of Operations Research, 1998, 81 433-466.

Watanabe, M., Furukawa, M., Mizoe, A., Watanabe, B., GA Applications to Physical Distribution Scheduling Problem. IEEE Transactions on Industrial Electronics, 2001, 48 724-730.

White Paper—From the Supplier to the Store Shelf: Supply Chain Transformations for Retailers and Wholesalers, Jun. 2006.

Blockbuster Inc.; "Form 10-K", business annual report, filed Mar. 15, 2006 for period of Dec. 31, 2005, 190 pages.

Blockbuster Inc.; "Form 10-K", business annual report, filed Mar. 1, 2007 for period of Dec. 31, 2006, 146 pages.

\* cited by examiner

MULTI-TIER CROSS-DEPARTMENT SCHEDULING MODEL FOR ORDER PROCESSING OPERATIONS

BACKGROUND

The present invention relates generally to scheduling models and, in an embodiment described herein, more particularly provides a multi-tier cross-department scheduling model for order processing operations.

A hypothetical Company B will be used herein to demonstrate the types of problems faced in typical complex order processing operations. Suppose, for example, that Company B is the industry leader in rentable DVD and game media with over 9,000 stores worldwide (over 5,600 in the United States including franchisees) and over $5.8 billion in annual revenue for fiscal year 2005 (over $3.9 billion in the United States including franchisees). The data used in this application is specific to the United States order processing and distribution operations and does not include any international activities.

The DVD and electronic game industries are highly peculiar when compared to others as they are characterized by an extremely compressed life cycle due to the release date structure imposed by the movie studios and to the short active life span inherent in any entertainment media product. As such it is very customary to see a great majority of sales activity in the first week a specific title is offered with very little activity in subsequent weeks. The only exception to this pattern would be titles that have a seasonal aspect such as Holiday genre as the individual holidays approach (for example Horror movies as Halloween approaches) or if there are complimentary titles offered (such as a part 3 of a movie trilogy causing increased activity for parts 1 and 2).

In this sense it is convenient to look at the industry as one with 52 distinct "seasons" as the new release offerings change on a weekly basis. We find from history that these weekly "seasons" have virtually no correlation with each other but there is a weak correlation to the calendar seasons. An example of the life cycle for a single product along with Company B's niche can be seen in the FIG. 1. It is important to notice that in both the theatrical release and the release on DVD the revenue decay curve is extremely steep.

We find that a product's life cycle can also take multiple paths based on when/how it is being used. As seen in FIG. 2 a product can move from a high volume new release title (region I) to a low volume catalog title (region IV) through the normal decay curve. Also, when seasonal activity and complimentary titles are considered product can shift from low volume to high even for older titles (region IV to region II). Likewise some titles may never leave the low volume range even if it is a new release product (region III to region IV).

History has shown that due to the continually changing product mix, the weekly aggregate volumes can drop to as low as 50% from one week to the next or can just as easily double. Forecasting this change in volumes is difficult as each new product is truly a new release with no history, forcing the industry to predict activity based on historical performance of "similar products" as well as product performance in theatrical venues. However, even the best models result in a high degree of error.

To accommodate the supply chain requirements of this highly specialized industry, logistic networks in the game and DVD rental industry have adopted methods and processes that are flexible enough to handle this extreme level of volatility while creating methods and processes that are robust enough to virtually eliminate late product deliveries. This is critical in this industry as with a nearly nonexistent maturity/decline phase in the product life cycle, any delays in product delivery would have the net effect of eliminating any potential for revenue to be gained from the product. Simply stated, any late deliveries have a tremendous cost impact.

Company B, as an industry leader has pioneered many of the initiatives necessary to remain competitive in this arena. Focusing specifically on Company B's distribution organization we can see in the process flow diagram shown in FIG. 3 that Company B has developed a system of 12 picking/processing departments followed by a total of 9 merge/sortation points in addition to a recursive product infeed as the cornerstone for its distribution model.

This process flow diagram represents picking and processing departments denoted by a "P" (P1, P2, etc.), conveyor merge points denoted by an "M", and system sortation points denoted by an "S." Picking and production activities include activities that range from simple retail picking to light manufacturing where raw discs and artwork (received in bulk) are built into the rental units as found in Company B stores. Conveyor merge points are used to route multiple conveyor lines to a single conveyor, and sortation points are used to route containers from a single conveyor line to multiple lines/departments.

Here (FIG. 3) sortation point S1 is being used to sort outbound containers direct to individual shipping doors and sortation point S2 is being used to sort orders that have been picked/processed to locations in the consolidation department (M3). Ideally all product would flow through Merge 3 (M3) and would exit the system through sorter 1 (S1) using the recursive infeed through Merge 2 (M2) as shown by the bold arrows in FIG. 3.

If capacity constraints were exceeded at any of the merge/sortation points along the process we would expect product to exit the system as the capacity constraints were encountered (for example at M1, M2, S1, S2, M3, etc.), thereby bypassing subsequent system constraints. This "system bypass" potential is shown on FIG. 3 by the arrows at the merge/sortation points labeled as $\overline{X}_{i,k,M1}$, $\overline{X}_{i,k,M2}$, $\overline{X}_{i,k,S1}$, $\overline{X}_{i,k,S2}$, $\overline{X}_{i,k,M3}$. The system bypass potential is undesirable as doing so would prevent containers from taking advantage of the consolidation process at merge point M3 which yields a much lower system cost by reducing the number of containers shipped. The nature of this consolidation relationship (merge M3) will be discussed more thoroughly below.

As cumbersome as these process flow diagrams appear, these are the result of multiple planned process improvement initiatives which are strategically designed to maximize throughput, while maintaining a very high level of flexibility and service level execution. In reality this process flow diagram is similar to environments that can be found at large "big box" retailers and package delivery companies.

Once orders are produced either through picking or manufacturing and exit the conveyor system, outbound containers are shipped to stores primarily through a pool point network of over 40 regional pool points. These regional pool points crossdock containers from the Company B distribution center to the stores. As Company B maintains one distribution facility and ships to over 5,600 stores within the United States, this "hub and spoke" design has proven to be more cost effective than creating multiple distribution facilities or shipping direct to stores.

It should be noted that shipping by pool point adds additional constraints (as each pool point location has a set weekly trailer departure schedule regardless of volume), and complexity (through having to coordinate with multiple carriers and pool point operators as they are regional in nature), with the trade off of a greatly reduced cost per piece shipped. The transit time from the distribution center to an individual store ranges from 2 to 7 days using the pool point shipping method (depending on region being shipped to) versus 1 to 5 days using other direct to store methods. Expense of shipping product using pool points is a fixed cost per container and is contract dependent.

For purposes of illustration, we will use an estimated cost of $2.50 per container shipped via pool point (independent of container dimension) and $6.00 as an estimated charge per container if the shipment is made direct to store (dependent on container dimension). Although we can already see the benefit here of using the pool point network ($2.50 vs. $6.00 per container), we will see during the problem formulation that the true benefit when combining pool points with a consolidation process dwarfs these initial cost savings.

From a complexity standpoint, a typical week in this environment can experience as many as 400 jobs which must be worked across 12 processing departments where individual jobs may be completed in anywhere from 1 to 5 different departments depending on job requirements which must then compete for capacity in up to 9 subsequent shared resources. The operating schedule consists of two 12 hour shifts per day across 6 days per week for a total of 12 shifts per week. As breaks, lunches, shift start up meetings, etc. must also be considered, we can normally assume 10.5 available production hours per employee per shift. Jobs that can be completed in multiple departments may experience higher processing costs in some departments over others. Roughly 5% of the overall demand is based on point of sale activity and 95% is based on forecasted allocation. Even though the 95% forecasted allocation is deterministic, the detailed planning window is still very short due to the nature of the business resulting in the need for a very flexible and dynamic solution.

Until now, the planning tools available at Company B were confined to the following—
1. A long range model (3-18 months) which plans aggregate activity for budgeting purposes;
2. An intermediate range model (1-3 months) which plans aggregate capacity by department (excluding merge/sortation constraints); and
3. A short range tactical model (1 week) which plans aggregate capacity by department (excluding merge/sortation constraints) including labor planning As a result of these three planning tools used at Company B, their distribution operation has been characterized by intermittent situations where capacity limits at critical nodes in the production and product handling processes have been exceeded due to unexpected activity spikes. Visibility to these activity spikes are typically known up to a couple of days in advance but as all scheduling previously took place in aggregate their ability to effectively control the operation at the discrete job level did not exist. This resulted in additional transportation costs, poor system utilization and a high cost of labor.

This problem as described at Company B is common in practice but has yet to be treated. Not only are there no available software packages on the market to address this problem, but there is also no available theoretical research on this topic.

There exists a great deal of literature regarding scheduling theory (Pinedo, 2002; Graves, 1981), most of which does not sufficiently address the problem stated above. Likewise, there is existing literature regarding scheduling models applied in practice (Brown et al. 2002; Moss et al. 2000; Olson et al. 2000) which, again, are different from the problem addressed in this application.

Dobson et al. (2001) deal with the problem of minimizing the scheduling cost (defined as the product of the holding cost and the flow time of a particular batch) which they state is similar to a weighted flow time. In doing so Dobson et al. consider an environment where jobs are organized into batches which must then be processed through a processing center. This is typical of many scheduling examples, however it does not consider parallel processing centers which must then compete for subsequent processing capacities.

Similarly, Kuchta et al. (2004) uses mixed integer programming to schedule parallel operations to maintain consistent output. Here their objective function is to minimize the sum of the excess production and the deficit production volume (not the net difference but rather the sum of "absolute values"). However, their approach does not address competition between multiple production departments which compete for shared downstream capacities.

Chen and Pundoor (2006) considers four problems with different cost related objective functions and assumes product that is time sensitive, with high variety, short life cycle and schedules them through parallel processing sites with a transportation cost. In this example Chen and Pundoor addresses an environment much more similar to what we find in this application (scheduling across production departments in parallel) but again stops short of addressing the possibility of the parallel departments competing for subsequent resources.

Keskinocak et al. (2002) state that they provide the first system to provide an integrated solution to consider interactions between different stages of the manufacturing and distribution process. In their application they use integer program formulation to maximize profit while meeting demand within specified time segments. They get past an integer programming hurdle (introduced by the need to prevent order splitting) through the use of a number of heuristic "fixes" and are successful in scheduling orders along a single serial path. They do not take into consideration an environment where orders are processed in parallel departments which must then compete for shared constrained resources.

Agnetis et al. (2004) also have an interesting problem where they present the goal of scheduling competing agents using a common resource. They use a set of nonpreemptive jobs to generate nondominating schedules which is a useful concept as this application also considers multiple jobs competing for a shared resource as one component of the stated problem. However the main focus for Agnetis et al. is to analyze the complexity of a number of scenarios where the objective function is to minimize the total weighted completion time and number of late jobs. They do not provide a solution or formulation to solve this problem, they merely analyze the complexity.

Watanabe et al. (2001) seek to schedule product through a shipping sorter, treated as a finite capacity queue, which is used to hold product until all outbound orders are present at which point they are shipped. They accomplish this through the use of a genetic algorithm. The problem that Watanabe et al. presents is one where orders that are fed into this queue must be properly sequenced before entering the system in order to prevent the queue from becoming filled with partial orders which consume physical space on the shipping sorter which reduces its effectiveness. This problem is quite different from the one presented in the present application as their model does not consider the possibility of scheduling multiple queues of this nature in series nor does it consider the scheduling of jobs across parallel departments as part of their order sequencing objective.

Chen and Vairaktarakis (2005) considers a situation where jobs are processed and then delivered to customers with no interim staging in an attempt to find a joint production and distribution schedule which optimizes an objective function. The stated goal of their objective function is to minimize the sum of the total distribution cost and a function measuring customer service. However, different from the problem for this application, Chen and Vairaktarakis do not consider an environment where the processing and distribution volumes are constrained. This is an aspect which is a necessity in this application.

Lee et al. (1996) and Pinto and Grossmann (1998) both present mixed integer linear programming models for petroleum and chemical processing applications. In both applications the common goal is to schedule a multiple stage environment where there are elements of parallel processing functions set up in series. However different from our application, their applications did not deal with the situation where there is competition for constrained subsequent resources.

Based on the available academic literature, a thorough evaluation of an environment where constrained parallel production competes for multiple levels of subsequent shared resources as found at Company B does not exist. In fact, the Company B operation is somewhat unique in how it mixes distribution with a heavy augmentation of light manufacturing and in how the change in product mix creates an increasingly more complex environment.

We should also point out here that the product life cycle at Company B differs greatly from traditional "big box" retailers, as these companies schedule activities based on a much smaller set of variables. Scheduling parameters at a big box retailer is typically confined to container picks, no production activities and very traditional and stable product seasonalities. Likewise SKU volatility is typically low, product life cycles are long and there are few strict in store date requirements. However, it should be noted that one significant aspect of the big box retailers environment is similar to what is found at Company B, specifically the parallel picking environment which competes for shared subsequent resources which is manifested in the form of multiple picking "modules" which proceed to a high speed sorter which separates product by shipping lane.

Even though the problem presented in this application exists in many companies today in one form or another, it is a problem that is often simply glossed over during discussions of operational improvement strategies. An example of this can be found in a white paper prepared by Dematic (formerly Rapistan), a premier logistics support/solutions provider which services large manufacturing companies. In their white paper they state that "... A properly executed wave management strategy will decrease order fulfillment time, boost productivity, and lower operational costs. Wave management is all about balancing and optimizing the work presented to the distribution center to perform: proper mix of small and large orders in a wave, # of expected containers, # of diverts off the sorter, etc. ... "

This statement ("... balancing and optimizing work presented ... # of diverts off the sorter ... ") sounds promising, but in reality we find that the scheduling software packages available on the market today are either ERP tools which depend on a well disciplined delivery schedule or tools which treat subsequent constraints as time delays with infinite capacity.

Given this, it is clear that what is absent is a short range planning solution that schedules discrete jobs to parallel picking/processing departments while allowing preferred departments by job, in addition to taking into consideration that these parallel departments compete for subsequent shared resources (merge and sortation points) which have finite capacity. The solution would preferably include an improved level loading of the workload which reduces the cost of labor and increases available capacity, and would preferably be easily adaptable to a variety of organizations with similar short range scheduling needs.

SUMMARY

In carrying out the principles of the present invention, a short range planning solution is provided which schedules discrete jobs to parallel picking/processing departments while allowing preferred departments by job, in addition to taking into consideration that these parallel departments compete for subsequent shared resources (merge and sortation points) which have finite capacity. One example is described below in which the key problem is formulated as a mixed integer program model with a primary objective of minimizing the total processing and transportation costs, and a secondary goal of balancing the workload throughout the planning horizon. Some unexpected benefits from this model include an improved level loading of the workload which reduces the cost of labor and increases available capacity, and an easy adaptability to other organizations with similar short range scheduling needs.

In one aspect, a scheduling model is provided for planning assignment of discrete jobs to multiple departments for shipment, wherein selected jobs are assignable to respective selected departments, and the departments share finite capacity resources. The model preferably includes a programmable computer system having loaded therein an objective function, and the computer system being operable to minimize a value of the objective function. The objective function comprises a sum of cost to ship containers in at least one of consolidated and unconsolidated forms, cost for each of a container equivalent not completed in a selected scheduling horizon, cost to process each job in each department, and cost for setup due to at least one of shift crossing and job splitting.

The cost to ship containers in at least one of consolidated and unconsolidated forms may be represented in the objective function by the expression $$P_1 \sum_{k=1}^{n} \sum_{i=1}^{r} X_{i,k,j1} + P_1 \sum_{k=1}^{n} \sum_{i=1}^{r} \sum_{j \in j2} \overline{X}_{i,k,j}$$

wherein $P_1$ is a shipping cost per container, i is a shift index number from 1 to r, j is a department index number from 1 to m, k is a job index number from 1 to n, $X_{i,k,j1}$ is a number of containers of job k processed in a selected merge department j1 during shift i, $\overline{X}_{i,k,j}$ is a number of containers of job k diverted direct to shipping from department j during shift i, and j2 is a subset of departments including the selected departments.

The cost for each of a container equivalent not completed in a selected scheduling horizon may be represented in the objective function by the expression $$\sum_{k=1}^{n} P_2 \frac{C_k}{B_k} \left( B_k - \sum_{j \in R} \sum_{i=1}^{r} Y_{ikj} \right)$$

wherein $P_2$ is a cost of shipping by an alternative mode of transportation, $C_k$ is a number of containers to be generated by job k, $B_k$ is a number of pieces to be shipped in job k, $Y_{ikj}$ is a number of pieces of job k shipped during shift i in department j, and R is a set of picking and processing departments other than merging or sorting departments.

The cost to process each job in each department may be represented in the objective function by the expression $$\sum_{j \in R} \sum_{k=1}^{n} \sum_{i=1}^{r} (d_{kj} Y_{ikj}).$$

wherein $Y_{ikj}$ is a number of pieces of job k shipped during shift i in department j, and $d_{kj}$ is a unit cost to process job k in department j.

The cost for setup due to at least one of shift crossing and job splitting may be represented in the objective function by the expression $$P_3 \sum_{k=1}^{n} \sum_{i=1}^{r} M_{ik}$$

wherein $P_3$ is a setup cost accounting for labor needed to switch between jobs or shifts, and $M_{ik}$ is equal to 1 if job k is processed in shift i, and is equal to 0 if job k is not processed in shift i.

These and other features, advantages, benefits and objects will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

Figure 1:
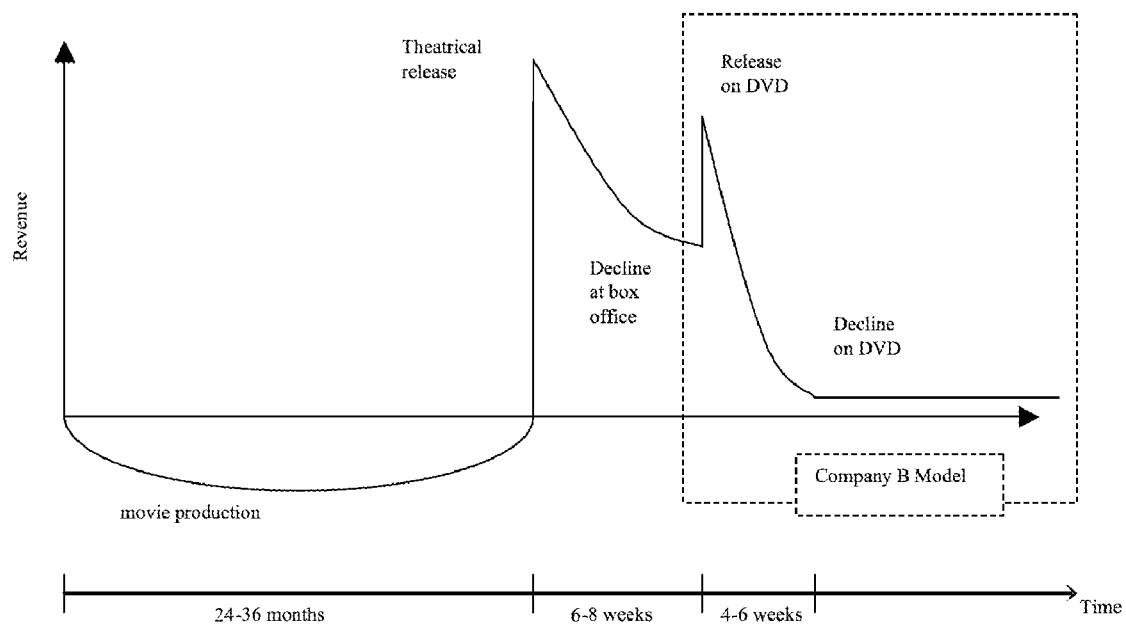
FIG. 1 is an example life cycle for an entertainment media product.
Figure 2:
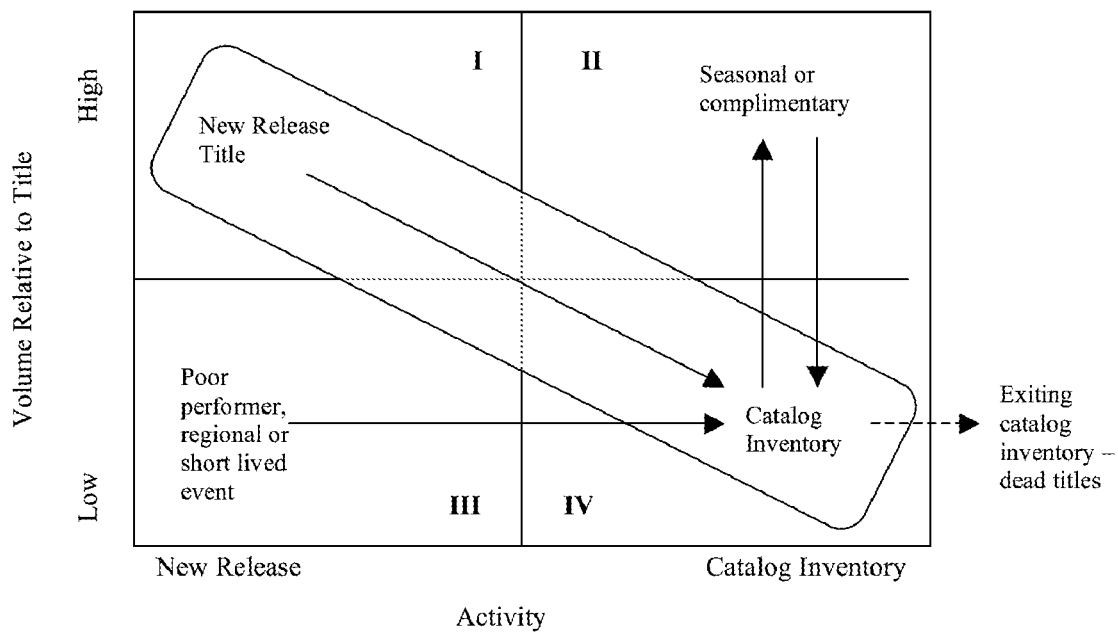
FIG. 2 is a plot of volume relative to title, divided into four regions.

It is to be understood that the various embodiments of the present invention are described herein merely as examples of useful applications of the principles of the invention, which is not limited to any specific details of these embodiments.

The principles of the invention will be described below as applied to the scheduling problems of the hypothetical Company B. Of course, the specifics of the Company B operation and the manner in which the principles of the invention are described as applying to the associated scheduling problems do not limit the applicability of the principles of the invention to other scheduling problems experienced by other companies.

As discussed above, Company B is a leader in the rental DVD and game media industry, and has developed a highly specialized distribution network. Company B operates in an environment where there is a high SKU base, and product is time sensitive with an extremely short life cycle. The SKU base and volume is highly volatile from week to week and there are short lead times due to manufacturing delays from the suppliers.

To accommodate this, Company B maintains a single source distribution network where these products are processed and packed for shipping to over 5,600 stores across the United States based on a demand forecast. Thus, Company B must schedule these processing and packing operations through a variety of parallel departments which compete for subsequent merge conveyors and sortation systems so that business and store service level requirements are met with a primary objective of minimizing the total processing and transportation costs with a secondary objective of balancing workload throughout the planning horizon.

To address this and other similar problems, we provide here the creation of a short range scheduling model which uses mixed integer programming techniques, and which is expected to result in substantial annual cost savings in addition to an increased system capacity as compared to current methods. This model is programmed in the AMPL programming language using a CPLEX version 10.1 mathematical formula solver, although other programming languages and mathematical formula solvers may be used if desired.

As the need and desire to continually reduce costs while maintaining capacities is a common thread across all supply chain practitioners, we also discuss the adaptability of this model to other organizations as this system of multiple processing departments which must then compete for subsequent shared constraints is very typical in industry. Additionally, to the best of our knowledge, this is to be the first model developed in theory and in practice to address a multiple department scheduling environment which competes for shared subsequent processing capacities and we are the first to implement such a mixed integer model in practice.

Formulating this problem involves the creation of a mixed integer program. Our main focus is on identifying how many containers ($X_{ikj}$) are produced of a particular product in a particular department on a given shift (similarly for pieces produced as denoted by $Y_{ikj}$) so as to minimize the cost of producing and transporting the product through effective system utilization. Departments in this application will refer to picking/processing departments as well as process merge and sortation points, and a job will refer to any request for picking/processing activity encompassing single and multiple products. A summary of the basic notations used is as follows.

$X_{ikj}$=number of cartons of job k processed in department j during shift i in cartons/shift, $\overline{X}_{ikj}$=number of cartons of job k diverted direct to shipping from department j during shift i in cartons/shift, $Y_{ikj}$=number of pieces of job k processed during shift i in department j, $$N_k = \begin{cases} 1 \text{ if job } k \text{ processed in primary processing department} \\ 0 \text{ otherwise (processed in secondary processing department)} \end{cases},$$

$$M_{i,k} = \begin{cases} 1 \text{ if job } k \text{ processed on shift } i \\ 0 \text{ otherwise} \end{cases},$$

S=Lower bound for total cartons created by shift,
T=Upper bound for total cartons created by shift,
$C_k$=number of cartons to be generated by job k,
$B_k$=number of pieces to be processed in job k,
$d_{kj}$=unit cost to process job k in picking/processing department j in dollars/piece,
$p_{kj}$=processing time of job k in picking/processing department j in hours,
$r_{kj}$=pick/processing rate for job k in picking/processing department j in pieces/hour,
$a_i$=scaling value to adjust department M3 capacity by shift to accommodate purge activities,
e=parameter expressing the maximum staffing level allowed per shift,
$q_{ik}$=indicator parameter introduced to allow job k to be completed on specific shifts only,
$b_k$=indicator parameter used to allow job k to bypass the normal product flow,
i=shift (1, . . . , r, r=scheduling horizon utilized in number of shifts),
j=pick/processing department (1, . . . , m, m=21 departments, including merge/sortation points),
k=job (1, . . . , n, n=number of jobs),
j is a number indicating a department. For purposes of clarity j will be replaced by a department name if the context is specific to one department only (such as M3, S2, etc). This notation is used interchangeably.
R=set of picking/processing department excluding merge/sortation points.
Let set Q(k)=P(k)∪S(k) where P(k) is the set of primary processing departments for job k and S(k) is the set of secondary processing departments for job k.

It is noteworthy to point out that $X_{ikj}$, $\overline{X}_{ikj}$, $Y_{ikj}$, $N_k$, $M_{ik}$, S, T are variables, $C_k$, $B_k$, $d_{kj}$, $p_{kj}$, $r_{kj}$, $a_i$, e, $q_{ik}$, $b_k$ are parameters which are known and i, j, k are indices. At Company B there are up to 12 shifts per week (2 per day at 6 days per week), picking and processing departments range from 1, . . . , 12 and total departments including merge and sortation points (j) range from 1, . . . , 21. We then formulate an objective function (Equation (1)) which seeks to minimize the total cost of manufacturing, handling and shipping. It is helpful to refer back to FIG. 3 when reviewing the formulation.

$$\text{Min } P_1 \sum_{k=1}^{n} \sum_{i=1}^{r} X_{i,k,j1} + P_1 \sum_{k=1}^{n} \sum_{i=1}^{r} \sum_{j \in j2} \overline{X}_{i,k,j} + \sum_{k=1}^{n} P_2 \frac{C_k}{B_k}\left(B_k - \sum_{j \in R} \sum_{i=1}^{r} Y_{ikj}\right) + \sum_{j \in R} \sum_{k=1}^{n} \sum_{i=1}^{r} (d_{kj} Y_{ikj}) + P_3 \sum_{k=1}^{n} \sum_{i=1}^{r} M_{ik}. \quad (1)$$

In this paper for Company B we shall define
$P_1$=2.5
$P_2$=6.0
$P_3$=20.0
j1∈{M3}
j2∈{M1, M2, M3, S1, S2}

We can better understand the meaning of this objective function if we review it in parts. Here, as applied to the Company B problem, the first part $$2.5\sum_{k=1}^{n}\sum_{i=1}^{r} X_{i,k,M3} + 2.5\sum_{k=1}^{n}\sum_{i=1}^{r}(\overline{X}_{i,k,M1}+\overline{X}_{i,k,M2}+\overline{X}_{i,k,S1}+\overline{X}_{i,k,S2}+\overline{X}_{i,k,M3}),$$

represents the cost to ship containers either in their consolidated form or unconsolidated direct from a merge/sortation point. $X_{ikj}$ represents the number of consolidated containers shipped at a cost of $2.50 per container (value given above as an estimated cost of using Company B's pool point transportation network) and the series of $\overline{X}_{ikj}$ variables represents the number of containers shipped direct from a merge/sortation point without the benefit of consolidation. The nature of this relationship (consolidated versus unconsolidated) will be explained in greater detail once we begin discussing Constraint (9).

The second part of the objective function $$\sum_{k=1}^{n} 6.0\frac{C_k}{B_k}\left(B_k - \sum_{j \in R}\sum_{i=1}^{r} Y_{ikj}\right) + \sum_{j \in R}\sum_{k=1}^{n}\sum_{i=1}^{r}(d_{kj}Y_{ikj}) + 20.0\sum_{k=1}^{n}\sum_{i=1}^{r} M_{ik},$$

shows three additional cost components which have been added to preference the desired solution based on activity costs. The first component calculates an estimated container equivalent ($C_k/B_k$) of any piece volume not completed ($B_k - \Sigma\Sigma Y_{ikj}$) in the given scheduling horizon of r shifts. Here a cost penalty of $6.00 per container is used (again, presented above as an estimated cost of shipping direct to stores using an alternative mode of transportation) for each container equivalent not completed in the given planning horizon. The second component ($\Sigma\Sigma\Sigma d_{kj}Y_{ikj}$) represents the cost to process job k in the department j∈R. This is important as we allow a job to be produced in multiple departments (primary where the cost is lowest, secondary where the cost is higher).

This option is the result of assigning primary processing departments for each job as well as maintaining a secondary overflow department for select departments in the event capacity maximums are hit. The third and last component of the objective function (20.0$M_{ik}$) represents a job/shift setup cost which accounts for the labor needed to switch over from picking or processing for one job to the next. As this model allows jobs to be processed across multiple shifts, this last component adds a penalty if unnecessary shift "crossing" or job splitting occurs. For purposes of confidentiality, we use a value of $20.00 for each job change over which is different from the actual value.

Figure 3:
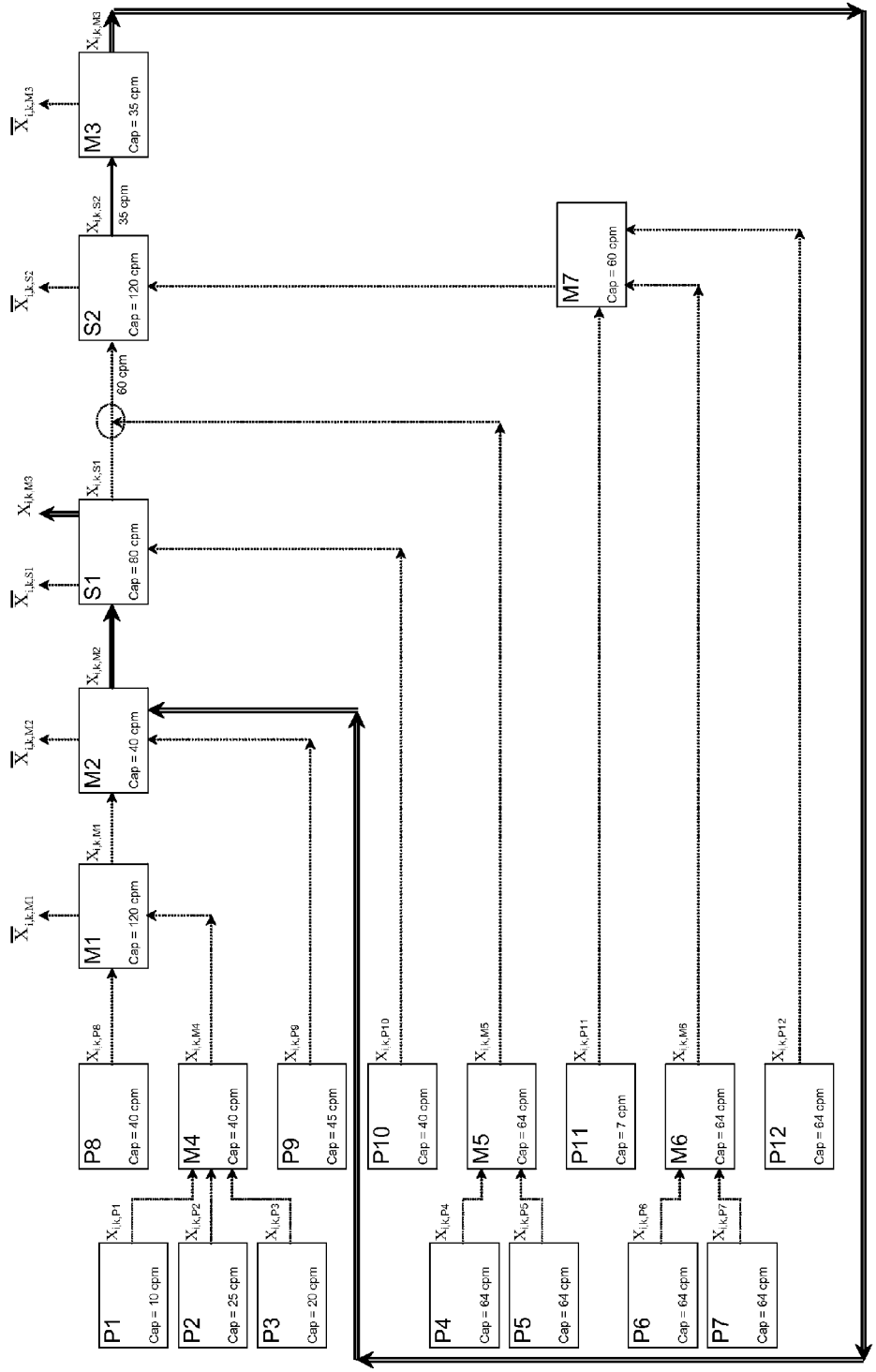
FIG. 3 is a process flow diagram for a representative distribution organization.

Next we have the beginning of a set of balance equations (Constraints (2) through (9) in the Appendix A) which are used to ensure that product entering each of the merge/sortation nodes from a preceding picking/processing/merge/sortation equates to what leaves these nodes. Each of the balance equations are consistent with the product flows as shown in FIG. 3 and only Constraint (9) will be discussed explicitly here as this is where the true benefit of utilizing the consolidation function appears.

$$6a_i X_{i,k,M3} + \overline{X}_{i,k,M3} = X_{i,k,S2} \; \forall i,k. \quad (9)$$

As we can see in Constraint (9), allowing containers to follow the path that flows through $X_{i,k,M3}$ results in a 6:1 reduction (compression) in the number of containers shipped through sortation point S1 if we ignore the scaling parameter $a_i$ (this parameter will be discussed in detail shortly). Merge point M3 is the only point where this reduction in container volume takes place in this system and from the objective function formulation, maximizing flow through this point will have a significant effect on minimizing the system cost. In practice, merge point M3 functions as a large physical container queue where multiple orders for a single destination are staged until either 6 containers are held in queue or until right before a pool point departure takes place, at which point a "purge" is generated.

The value of 6 containers was selected due to the physical size of the queue in relation to the number of destinations shipped to. Once a purge is generated the contents of all containers held in queue are placed into a single large shipping container. This effect is particularly important as we discussed above that the pool point charge per container was a fixed rate. When combined, the 6:1 compression rate and the fixed cost per container shipped effectively generates a ⅙ cost per container adjustment for product shipped. In essence this further reduces the shipping cost of a $2.50 container to $0.416.

Figure 4:
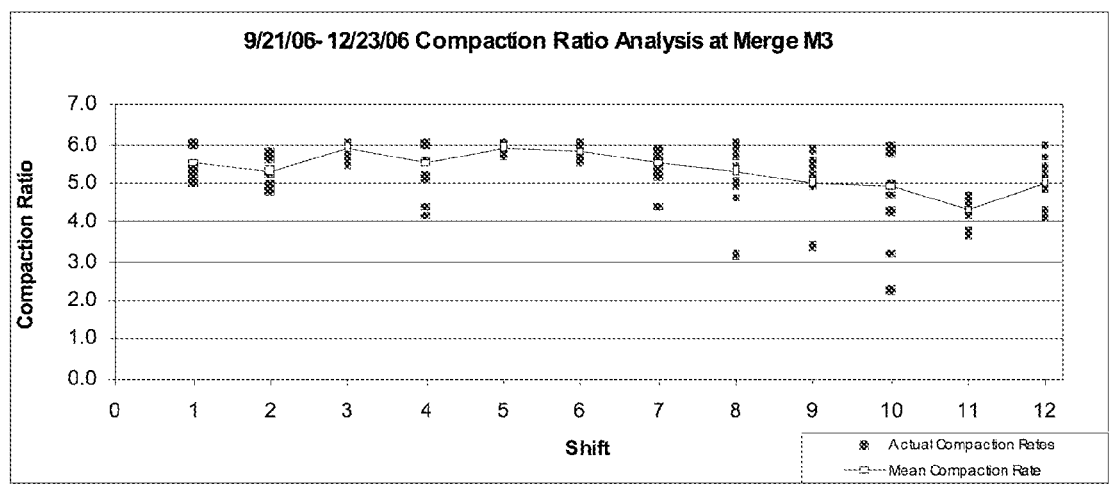
FIG. 4 is compaction ratio analysis at merge M3.

The scaling parameter $a_i$ was introduced above to more appropriately represent the inter-shift dynamics present in the consolidation process. As consolidation purges can take place before the six container threshold is reached, this additional purge has the net effect of reducing the compression ratio which the $a_i$ parameter is intended to simulate. As we can see from historical data in FIG. 4 this compaction ratio at merge point M3 for a 3 month period from Sep. 21, 2006 through Dec. 23, 2006 maintains some consistency by shift with an upper bound of 6.0.

As the model has been created for a compaction ratio of 6.0 and if we are to assume that the actual compaction ratios by shift follows the bold line (mean compaction ratio by shift in FIG. 4) then we can expect to experience $a_i$ values by shift as shown in Table 1. These values for $a_i$ range anywhere from 0.72 to 0.98, where a lower scaling factor would indicate less than a 6:1 compression implying an increase in early purges due to pool point departures.

TABLE 1

Scaling Parameter $a_i$ Values by Shift.

| Shift | Compaction Ratio | $a_i$ |
|---|---|---|
| 1 | 5.50 | 0.92 |
| 2 | 5.30 | 0.88 |
| 3 | 5.90 | 0.98 |
| 4 | 5.50 | 0.92 |
| 5 | 5.90 | 0.98 |
| 6 | 5.80 | 0.97 |
| 7 | 5.50 | 0.92 |
| 8 | 5.30 | 0.88 |
| 9 | 5.00 | 0.83 |
| 10 | 4.90 | 0.82 |
| 11 | 4.30 | 0.72 |
| 12 | 5.00 | 0.83 |

Looking at the flow constraints shown on FIG. 3 we can now intuitively expect that the merge point M3 constraint at 35 containers per hour is a likely primary system bottleneck as it is at the end of the system, has one of the lowest throughput capacity constraints and experiences a cyclic pattern of reduced container compaction based on ongoing shipping activity, all of which we find to be true. Based on this it would be desirable to level load the activity at the node as much as possible to thoroughly utilize its capacity. In the absence of the scaling factor $a_i$ which varies by shift we could simply focus on balancing the number of containers entering or exiting merge point M3. However, as we do have the scaling factor $a_i$ to consider, and as it varies by shift which causes the inbound/outbound ratio at merge point M3 to vary by shift as well, we must now seek to balance the total flow at merge point M3 as shown in FIG. 5.

Figure 5:
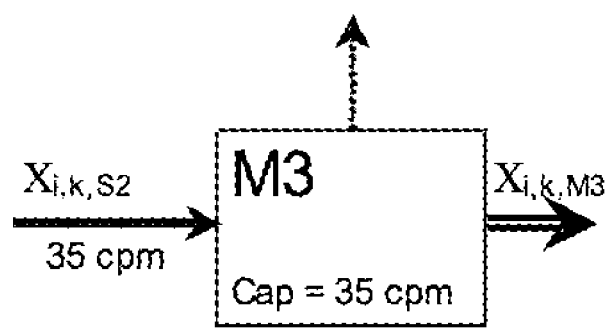
FIG. 5 is a process flow diagram for total flow at merge M3.

From FIG. 5 it is clear that any container flow through merge point M3 (in to and out of) must be planned to be as level loaded as possible across the multiple shift planning horizon in order to best utilize the capacity at this merge point. To accomplish this we define two variables, S and T, to represent arbitrary upper and lower bounds for the number of containers being planned through this point as shown in Constraints (10) and (11). Constraint (12) is then used to maintain this window between upper and lower bounds at an acceptable level.

$$S \leq \sum_{k=1}^{n} (X_{i,k,M3} + \overline{X}_{i,k,M3} + X_{i,k,S2}) \forall i, \tag{10}$$

$$T \geq \sum_{k=1}^{n} (X_{i,k,M3} + \overline{X}_{i,k,M3} + X_{i,k,S2}) \forall i, \tag{11}$$

$$T - S \leq 500. \tag{12}$$

As the total volume at merge point M3 can reach 25,200 containers per 12 hour shift (based on the constraint of 35 containers per minute) we can see that this 500 container window as shown in Constraint (12) will allow at most a 2% variation from shift to shift which is deemed by management to be acceptable as they currently experience an average shift to shift variation of 22.7%. This reduction in volume volatility at merge point M3 will be of great benefit in reducing labor costs as well as increasing available capacities which will be discussed below. Following this we have an array of system constraints (Constraints (13) through (41) found in Appendix A) which are used to ensure that capacity violations across any processing/picking/merge/sortation departments are not violated.

Our next step is to require jobs to be completed in either their primary or secondary processing departments. This is achieved through introducing the $N_k$ integer variable where we allow $N_k=1$ if it is completed in its primary processing department and $N_k=0$ otherwise. This can be seen in Constraints (42) and (43). In using this indicator variable we state that the product $C_k N_k$ (where $C_k$ is the total containers to be produced for job k) cannot be less than the number of containers produced ($X_{i,k,j}$) for job k in department j across all shifts. Given this, job k is either produced $$X_{i,k,j} \leq C_k N_k \, j \epsilon P(k) \, \forall i,k, \text{ where } P(k) \text{ is a set of primary processing department for job } k, \tag{42}$$

$$X_{i,k,j} \leq C_k(1-N_k) \, j \epsilon S(k) \, \forall i,k, \text{ where } S(k) \text{ is a set of secondary processing department for job } k. \tag{43}$$

entirely in its primary department or entirely in its secondary processing department. Similarly, in Constraints (44) and (45) we require that pieces processed for each job takes place in either its primary or secondary processing department and not both. Here $Y_{i,k,j}$ is the pieces for job k processed in department j during shift i and $B_k$ is the total pieces to be produced for job k.

$$Y_{i,k,j} \leq B_k N_k \, j \epsilon P(k) \, \forall i,k, \text{ where } P(k) \text{ is a set of primary processing department for job } k, \tag{44}$$

$$Y_{i,k,j} \leq B_k(1-N_k) \, j \epsilon S(k) \, \forall i,k, \text{ where } S(k) \text{ is a set of secondary processing department for job } k. \tag{45}$$

Now that jobs are assigned to specific departments, they need to be assigned to specific shifts. To do this we introduce the $M_{ik}$ integer variable in Constraint (46), where $M_{ik}=1$ if job k is performed on shift i and $M_{ik}=0$ otherwise, and state that the product $C_k M_{ik}$ (number of containers for job k completed on shift i) cannot be less than the sum of the containers produced across all departments for each shift and job ($X_{ikj}$). We then perform a similar operation for pieces produced as shown in Constraint (48). At this point we also see a new parameter $q_{ik}$ which is used to allow work to be completed on specific shifts based on the business needs, where $q_{ik}$ takes on the value of 0 or 1 (a $q_{ik}$ value of 1 stating a job can be performed on a specific shift and a value of 0 stating the job cannot take place). The inclusion of a parameter such as $q_{ik}$ is important in order to accommodate rush orders and specialized scheduling requirements. To limit the number of shifts a job can be performed on to a maximum of 2 shifts (again based on business requirements which will be explained in the implementation section) we have added Constraint (47) which states that the sum of the indicator variable $M_{ik}$ across all shifts in the planning horizon must not be greater than 2.

$$\sum_{j \in Q(k)} X_{i,k,j} \leq C_k M_{i,k} q_{ik} \, j \in Q(k) \forall \, i, k, \quad (46)$$

$$\sum_{i=1}^{r} M_{i,k} \leq 2 \forall \, k, \quad (47)$$

$$\sum_{j \in Q(k)} Y_{i,k,j} \leq B_k M_{i,k} q_{ik} \, j \in Q(k) \forall \, i, k. \quad (48)$$

In Constraint (47) the value of a 2 shift maximum was used because that was most appropriate at Company B. In other applications this number may be varied based on the application requirements. Our next step is to ensure that if a job must be performed on multiple shifts that the shifts are consecutive to prevent unnecessary long term staging of orders and job change over time. To accomplish this we use the following logic assuming a 12 shift scheduling horizon.

$$M_{1,k} + M_{3,k} \leq 1 \forall \, k,$$
$$M_{1,k} + M_{4,k} \leq 1 \forall \, k,$$
$$M_{1,k} + M_{5,k} \leq 1 \forall \, k,$$
$$\vdots$$
$$M_{1,k} + M_{12,k} \leq 1 \forall \, k,$$
$$M_{2,k} + M_{4,k} \leq 1 \forall \, k,$$
$$M_{2,k} + M_{5,k} \leq 1 \forall \, k,$$
$$M_{2,k} + M_{6,k} \leq 1 \forall \, k,$$
$$\vdots$$
$$M_{2,k} + M_{12,k} \leq \forall \, k,$$
$$\vdots$$
$$M_{10,k} + M_{12,k} \leq 1 \forall \, k.$$

Using this methodology, a job that is completed across multiple shifts is forced to be worked on consecutive shifts. If we were to state all necessary constraints in this manner for a 12 shift operation we would require 55 additional constraints. In Appendix A we can see additional constraints which are used to ensure a shift's production capacity in a given department is not exceeded (Constraint (60)), that the pieces produced in a given shift ($Y_{ikj}$) cannot exceed the available work ($B_k$), and that the containers produced in a given shift ($X_{ikj}$) cannot exceed the available work ($C_k$) which are shown in Constraints (61) and (62), respectively.

Lastly, we must ensure that the ratio of pieces completed per shift matches favorably with the containers completed per shift for each job and department. If we were to not control this explicitly we found that results ended up with pieces being completed independent of containers which for example could result in 10% of the pieces produced in a given shift for a particular job, but with 90% of the container load completed for that same job in that same shift. This would not be appropriate. To address this we introduced Constraint (63) which requires the pieces per container ratio ($Y_{ikj}/X_{ikj}$) to be bounded by the following limit: $[B_k/C_k - 0.5/X_{ikj}, B_k/C_k + 0.5/X_{ikj}]$ in pieces per container. In this manner we now have a total piece window of +/−0.5 which is sufficiently tight. This constraint now provides that if a job was completed on multiple shifts, the ratio of pieces per container completed on one shift for a job is sufficiently close to the total pieces per container for that job.

$$X_{ikj}\left(\frac{B_k}{C_k}\right) - 0.5 \leq Y_{ikj} \leq X_{ikj}\left(\frac{B_k}{C_k}\right) + 0.5 \forall \, i, k, j. \quad (63)$$

Data used in this model for parameters $d_{kj}$ (cost per piece to process), $P_{kj}$ (processing time), $r_{kj}$ (pick/processing rate), $C_k$ (number of containers generated) and $B_k$ (number of pieces generated) are all outputs generated from a warehouse management system (WMS). It should be noted that although this raw data is readily available, neither the existing WMS package nor any competitive WMS packages currently on the market provide the functionality needed to address the problem presented in this application. Parameters $a_i$ are based on actual historical data and parameter e (maximum worker staffing allowed per shift) is based on historical/future constraints on maximum staffing levels that can be expected to be supported. A complete listing of the formulation developed in this application can be found in Appendix A.

A conventional programmable computer system with CPLEX (version 10.1) was utilized to solve this problem with code written in AMPL, and with live data hypothetically pulled directly from the Company B warehouse management system (WMS) for testing. Doing this allowed us to assess the results of the formulation against a data set that had the variability it would encounter once implemented. As this scheduling model is a complex mixed integer program, we should not be surprised that the computational requirements grow exponentially as the number of shifts used in the planning horizon increases. In fact, we found that the computational speed (in seconds) using a 42 job data set comprised of 86,295 containers and 771,025 pieces which was planned for Dec. 13, 2006 night shift through Dec. 15, 2006 day shift (data set can be found in Appendix B) across the work landscape outlined earlier resulted in the computing times found in Table 2 with run time given in seconds with the objective function given in dollars. A variety of T-S values (range between the maximum and minimum containers processed through merge point M3) and planning horizons in number of shifts were used to illustrate the model sensitivity to these parameters.

TABLE 2

Computational speed (run time in seconds) based on various shift and (T-S) values for Dec. 13, 2006 through Dec. 15, 2006 data set.

| | (T-S) = 500 | | (T-S) = 1,000 | | (T-S) = 1,500 | |
|---|---|---|---|---|---|---|
| shifts | run time | objective function | run time | objective function | run time | objective function |
| 4 | 22 | 81,110 | 40 | 81,064 | 39 | 81,018 |
| 5 | 381 | 81,745 | 162 | 81,691 | 560 | 81,639 |
| 6 | 1,561 | 82,175 | 4,397 | 82,115 | 1,963 | 82,052 |
| 7 | 60,476 | 82,486 | 39,714 | 82,414 | 79,253 | 82,353 |
| 8 | NA | NA | NA | NA | NA | NA |

As we can see in Table 2, when we defined the T-S value to be 500 with a 7 shift scheduling horizon, the computational time was 60,476 seconds, or roughly 16.8 hours, which involved 1,249,690 branch and bound nodes and 54,273,904 MIP simplex iterations and returned an objective function of $82,486. Schedules for this data set were not run across an 8 shift horizon due to the computing times involved. Understanding that the rates of increase for these computing times are exponential with regards to the number of shifts being planned across, routine planning for time periods over 6 shifts could become prohibitive. To improve the program run time without significantly affecting the optimality of the objective functions, we also ran the same model (in AMPL) with the same data set using CPLEX "options" (described below) which are designed to reduce computing times. Results of this model using CPLEX with options can be found in Table 3 with the options used as follows.

'probe'—using this option prompts CPLEX to removes redundant variables and constraints in order to reduce the problem size before starting branch and bound algorithms.

'mipgap'—this option terminates the search when the difference between the objective value is within a specified distance from the optimal value $$\left(\frac{|\text{best node} - \text{best integer}|}{1.0 + |\text{best node}|}\right) < mipgap \text{ value}$$

'repeatpresolve'—this option allows repeated presolves with cuts and allows new root cuts

TABLE 3

Computational speed (run time in seconds) using CPLEX processing options based on various shift and (T-S) values for Dec. 13, 2006 through Dec. 15, 2006 data set.

| | (T-S) = 500 | | (T-S) = 1,000 | | (T-S) = 1,500 | |
|---|---|---|---|---|---|---|
| shifts | run time | objective function | run time | objective function | run time | objective function |
| 4 | 62 | 81,105 | 62 | 81,058 | 63 | 81,017 |
| 5 | 64 | 81,748 | 63 | 81,700 | 63 | 81,657 |
| 6 | 65 | 82,194 | 65 | 82,123 | 64 | 82,071 |
| 7 | 66 | 82,487 | 66 | 82,422 | 68 | 82,363 |
| 8 | 80 | 82,841 | 69 | 82,674 | 70 | 82,596 |

As we can see in Table 3, the computing times of this scheduling model has been greatly reduced. This result should not be surprising as the three options specified above work together to reduce the complexity and terminate the program when the solution is sufficiently close to the best solution. In comparing the objective function results from Table 2 to that of Table 3, we can also see the difference in objective function values as shown in Table 4. Here it is very easy to see that the difference in the normal CPLEX processing and the CPLEX processing with options yields nearly identical results with a worst case scenario of a $19 out of $82,175 (T-S value of 500 and 6 shifts) which differs by only 0.019% which is not significant in this application. When computing times are taken into consideration (66 seconds in Table 3 for T-S of 500 and 7 shifts versus 60,476 seconds in Table 2) it is clear that running this scheduling model in CPLEX using the options as shown above is preferred as the results are so close to optimal.

TABLE 4

Difference in objective function values for data set Dec. 13, 2006 through Dec. 15, 2006 for Tables 2 and 3 based on various shift and (T-S) values.

| | (T-S) Values | | |
|---|---|---|---|
| shifts | 500 | 1000 | 1500 |
| 4 | 0 | 0 | 0 |
| 5 | −3 | −9 | −18 |
| 6 | −19 | −8 | −19 |
| 7 | −1 | −8 | −10 |
| 8 | NA | NA | NA |

As the existing planning environment at Company B is highly volatile with jobs being added to the scheduling horizon daily, and as the typical visibility to what is able to be scheduled is confined to roughly 4 shifts worth of volume, we settled on running this application on a daily basis for a rolling 4 shift horizon. Additionally, to be usable in a real world application the formulation should be able to run in under 5 minutes which is easily accomplished as shown by the results in Table 3. As the importance of minimizing the inter-shift workload volatility at merge point M3 is paramount this also allows us to maintain a low (T-S) value of 500 when solving this problem.

If a longer scheduling horizon were needed (such as a full 12 shift period), this model could be processed independently using forecasted data instead of actual orders. As visibility to discrete job workload is normally given for a 4 shift horizon only, a full 12 shift horizon could be planned as a rough plan through using the available longer range forecasts. Information from this rough planning would be valuable for identifying potential system capacity shortfalls in advance so that alternative solutions could be developed ahead of time. A sample of a 12 shift data set using forecasted data only can be found in Appendix C. In testing this 12 shift horizon from Appendix C using the CPLEX options as shown above we found that the model took 1,066 seconds (18 minutes) to run using a T-S value of 500 returning an objective function value of $241,655. Running the same model using CPLEX without options with the same data set and parameters this program took in excess of 73 hours. At 73 hours the program had to be terminated manually due to the tree size exceeding 2.4 gigabytes which exceeded the computer memory size (at this point the computer began using hard disc space as added memory which greatly slowed down the computing speed). Upon program termination the model had arrived at an objective function value of $241,618 with a MIP gap of 0.04% with a best node (not necessarily feasible) objective function value of $241,523. Given this, running CPLEX with options yielded a solution that was at worst 0.05% ($132) higher than the best possible (best node) solution at a computing time of only 18 minutes. Clearly this program can feasibly be applied in situations where a scheduling horizon much greater than the 4 shift window required at Company B is needed while returning a solution that is not significantly different from an optimal solution.

Analyzing the results from the data found in Appendix B further, if we take the 42 job data set which was scheduled across the 4 shift period Dec. 13, 2006 night shift through Dec. 15, 2006 day shift we find that the results can be summarized in Table 5. Even though the maximum and minimum $X_{ikj}$ values at merge point M3 initially appear to exceed 500, considering the impact of the $a_i$ scaling parameter we can see the total workload at this point is being maintained as expected. Also notice that for containers we display results for the full set of departments j (including merge/sortation points), and for pieces processed we only display results for departments j∈R (excluding merge/sortation points).

TABLE 5

Summary results for workload planned Dec. 13, 2006 night shift through Dec. 15, 2006 day shift (see Appendix B for full data set).

ΣX = Total number of cartons processed by department

| shift | P1 | P2 | P3 | P4 | P5 | P6 | P7 | P8 | P9 | P10 | P11 | P12 |
|---|---|---|---|---|---|---|---|---|---|---|---|---|
| 1 | 0 | 0 | 14,082 | 0 | 4,156 | 2,348 | 463 | 0 | 0 | 0 | 2,769 | 0 |
| 2 | 0 | 0 | 10,019 | 1,826 | 0 | 1,249 | 1,907 | 3,484 | 0 | 0 | 2,043 | 1,915 |
| 3 | 0 | 1,179 | 9,318 | 557 | 0 | 0 | 0 | 5,805 | 0 | 0 | 3,358 | 1,711 |
| 4 | 0 | 8,129 | 0 | 0 | 0 | 0 | 0 | 9,041 | 0 | 0 | 936 | 0 |
| Total | 0 | 9,308 | 33,419 | 2,383 | 4,156 | 3,597 | 2,370 | 18,330 | 0 | 0 | 9,106 | 3,626 |

ΣX = Total number of cartons processed through each merge/sortation point

| shift | M1 | M2 | M3 | M4 | M5 | M6 | M7 | S1 | S2 |
|---|---|---|---|---|---|---|---|---|---|
| 1 | 14,082 | 18,045 | 3,963 | 14,082 | 4,156 | 2,811 | 5,580 | 18,045 | 23,776 |
| 2 | 13,519 | 17,536 | 4,017 | 10,019 | 1,826 | 3,156 | 7,114 | 17,536 | 22,459 |
| 3 | 16,712 | 20,039 | 4,016 | 10,497 | 557 | 0 | 5,069 | 20,039 | 21,689 |
| 4 | 17,170 | 15,308 | 3,125 | 8,129 | 0 | 0 | 936 | 15,308 | 13,121 |
| Total | 61,483 | 70,928 | 15,121 | 42,727 | 6,539 | 5,967 | 18,699 | 70,928 | 81,045 |

ΣY = Total number of pieces processed by department

| shift | P1 | P2 | P3 | P4 | P5 | P6 | P7 | P8 | P9 | P10 | P11 | P12 |
|---|---|---|---|---|---|---|---|---|---|---|---|---|
| 1 | 0 | 0 | 69,562 | 0 | 37,344 | 48,000 | 4,593 | 0 | 0 | 0 | 11,523 | 0 |
| 2 | 0 | 0 | 31,288 | 48,000 | 0 | 25,540 | 48,000 | 29,448 | 0 | 0 | 4,234 | 48,000 |
| 3 | 0 | 13,158 | 38,661 | 14,651 | 0 | 0 | 0 | 203,099 | 0 | 0 | 8,731 | 42,866 |
| 4 | 0 | 39,503 | 0 | 0 | 0 | 0 | 0 | 3,252 | 0 | 0 | 1,572 | 0 |
| Total | 0 | 52,661 | 139,511 | 62,651 | 37,344 | 73,540 | 52,593 | 235,799 | 0 | 0 | 26,060 | 90,866 |

Likewise in Table 6 we can see the raw data which comes directly from the AMPL program. Here we can see that all jobs have been scheduled to an available shift with only 4 jobs scheduled over multiple shifts, where a value of "1" indicates the job was scheduled for the shift. Although valuable, this information in its present form is very cumbersome and is not very useable by the operations group. We will display a more "user friendly" version of this data in the implementation section below.

TABLE 6

Job schedule for workload planned Dec. 13, 2006 night shift through Dec. 15, 2006 day shift (see Appendix B for full data set).

| | $M_{ik}$ | | | |
|---|---|---|---|---|
| Job | Shift 1 | Shift 2 | Shift 3 | Shift 4 |
| 1 | 1 | | | |
| 2 | 1 | | | |
| 3 | 1 | | | |
| 4 | 1 | | | |
| 5 | 1 | | | |
| 6 | 1 | | | |
| 7 | 1 | | | |
| 8 | 1 | | | |
| 9 | 1 | | | |
| 10 | 1 | | | |
| 11 | 1 | | | |
| 12 | 1 | | | |
| 13 | 1 | 1 | | |
| 14 | 1 | 1 | | |
| 15 | 1 | | | |
| 16 | | 1 | | |
| 17 | | 1 | | |
| 18 | | 1 | | |
| 19 | | 1 | | |
| 20 | | 1 | | |
| 21 | | | | |
| 22 | | | 1 | 1 |
| 23 | | | 1 | 1 |
| 24 | | | 1 | |

TABLE 6-continued

Job schedule for workload planned Dec. 13, 2006 night shift through Dec. 15, 2006 day shift (see Appendix B for full data set).

| Job | $M_{ik}$ | | | |
|---|---|---|---|---|
| | Shift 1 | Shift 2 | Shift 3 | Shift 4 |
| 25 | 1 | | | |
| 26 | | 1 | | |
| 27 | | 1 | | |
| 28 | | 1 | | |
| 29 | | 1 | | |
| 30 | | 1 | | |
| 31 | | 1 | | |
| 32 | | 1 | | |
| 33 | | 1 | | |
| 34 | | 1 | | |
| 35 | | 1 | | |
| 36 | | 1 | | |
| 37 | | 1 | | |
| 38 | | 1 | | |
| 39 | | | 1 | |
| 40 | | | 1 | |
| 41 | | | 1 | |
| 42 | | | | 1 |

During the implementation phase, while working with the Company B Production Planning department and the Operations Management teams, additional requirements were identified which are useful to provide solutions that better fit existing business requirements. A summary of key additional requirements are discussed below.

1. Several of the picking/processing departments had piece volume limitations in addition to the system imposed container constraints. As a result there needed to be piece volume limiting constraints in addition to those required by container. This resulted in the addition of Constraints (25a) and (32a) (found in Appendix A) which are identical to their respective container constraints (Constraints (25) and (32)) except that they are intended to address piece capacities at select department $j \in R$ for a given shift i.

2. As stated early in this application, merge point M3 was identified as the primary bottleneck which needed to be evaluated with regards to over capacity concerns. Initial problem formulation results yielded solutions which had highly variable volumes at this point at each shift (albeit below capacity) and it was deemed desirable to keep the throughput at this point as level loaded as possible. In order to minimize this volume fluctuation for constraint M3 across shifts, the limiting value of "T-S" was added (Constraints (10), (11), (12)). As T-S equates to the difference between the largest container volume at merge point M3 and the lowest, specifying explicitly that this value should be less than or equal to 500 added a level loading effect at this critical point. Once again, the value of 500 was selected because based on historical data it allowed at most a 2% variation from shift to shift which was deemed by management to be acceptable.

3. Initial formulation results provided solutions where there was a great imbalance between the ratio of pieces and the ratio of containers completed by shift for jobs that crossed shifts. This was found to be due to pieces being scheduled completely independent of containers as there was no tie between the piece completion rate by shift and that of the containers. As a result we found that we could arrive at a schedule where we could have 10% of the pieces produced in a given shift for a particular job, but with 90% of the container load completed for that same job in that same shift. This expectation was not appropriate. Constraint (63) was added to ensure that if a job was completed on multiple shifts, the ratio of pieces per container completed on one shift for a job was sufficiently close to the total pieces per container for that job. This is explained in detail in the formulation section where Constraint (63) is discussed.

4. During implementation jobs were found that needed to be completed on specific shifts only. This was largely due to certain rush orders which needed special handling or other special requirements. To accommodate this, the $q_{ik}$ parameter was introduced with the $M_{ik}$ variable (integer variable which equates to 1 if job k is performed on shift i and 0 otherwise) as shown in Constraints (46) and (48). Here the $q_{ik}$ parameter takes on the value of "1" if job k is allowed to be performed on a specific shift i and takes on a value of "0" otherwise.

5. Similar to a job needing to be completed before the end of the scheduling horizon is the need to freeze capacity in specific departments and shifts. This need is a result of the high incidence of late arrival expedited work. To accommodate this requirement for "placeholders" for expected work, a technique of adding "dummy" jobs to the data file was used in conjunction with the $q_{ik}$ parameter as shown in requirement #4 above. This effectively allowed expected work to be scheduled in the midst of known jobs.

6. On an intermittent basis there was the need to be able to force specific jobs to specific departments and/or shifts due to special job requirements. This need was handled through forcing $M_{ik}$ variable to take on the required values. As can be seen in Constraints (46) and (48) this would has the net effect of "turning off" individual shifts and departments as the need arises.

7. As Company B utilizes pool points for a majority of their outbound shipments to reduce cost, trailers ship to different regions on different days based on their in transit lead time. As a result of this, any containers that are held in queue in merge M3 immediately before a pool point departure (trailer departure) must be purged on a weekly basis before it has reached the 6:1 compression threshold to ensure that they meet their ship date. In practice we find that this purge activity can affect the capacity of this node by anywhere from 0% to 30% through the course of a single week. As a result of this, Constraints (9) and (41) were modified to add the scaling parameter $a_i$ which varies by shift depending on the purge activity level which better represents the actual environment. The parameter values for $a_i$ were derived from historical data and were found to range anywhere from 0.72 to 0.98 where the lower scaling factor would indicate less than a 6:1 compression ratio at merge point M3 implying more purges than would occur due to normal consolidation activity (purges taking place before 6 containers are collected in queue) and a value of 1.0 would represent a pure 6:1 compression ratio when there are no early purges.

8. As we must consider that the total number of available employees is a limiting factor, Constraint (60a) was added where on any given shift the hours utilized must be less than or equal to the product of e (parameter for the maximum number of people allowed per shift) and 10.5 (available hours per 12 hour shift taking into account breaks, lunches, start up meetings, etc.). If in time we find there is a need to further constrain the number of workers per shift per department (such as no more than 50 employees per shift for processing department P2), then we could simply add another parameter (such as $e_j^{max}$) to Constraint (60) as shown below. Here we can see that $e_j^{max}$ represents the maximum allowed staffing for department j.

$$\sum_{k=1}^{n} \frac{Y_{i,k,j}}{r_{k,j}} \le 10.5 e_j^{max}, \forall i, j$$

9. The initial problem formulation considered that the desired (ideal) state was to have all containers produced flow through merge M3 and follow the recursive infeed to exit the system through sortation point S1. However in a live environment we must also consider jobs where bypassing all internal merges is desired in order to accommodate planned expedited orders (due to short lead times, etc.). This requirement is handled by adding the constraint that the sum of the containers bypassed at points $\overline{X}_{i,k,M1}+\overline{X}_{i,k,M2}+\overline{X}_{i,k,S1}+\overline{X}_{i,k,S2}$ is greater than or equal to the number of containers ($C_k$) for job k if the job k is identified as one that is required to bypass the normal product flow path. This can be seen by the introduction of the $b_k$ parameter in conjunction with Constraint (41a) (see Appendix A). In this manner intentional system bypasses can be handled.

10. As the intended users of this model have no integer/linear programming experience, the program input and output will need to be very user friendly stating which jobs are to be completed on which shift along with expected volumes and total worker staffing requirements by department. This requirement is needed to make the output useable and was accomplished using widely available conventional office suite software programs.

As a result of the implementation we have been successful in generating shift production schedules for the distribution operation at Company B using the formulation described. This production schedule is run daily for a rolling 4 shift horizon and is used to specify which jobs are to be completed on each shift and in what quantity. As the bottlenecks are based on containers and department capacities are based on individual pieces processed, both are displayed on the production schedule. In Table 7 we see the shift production schedule by piece count in each shift, specified by a "wave name" which is synonymous with "job" in Company B nomenclature and is used interchangeably. This level of detail and simplicity of information makes it very useable by the distribution operations team. Once again, the source data set which was used to create both Table 7 and Table 8 can be found in Appendix B.

Similarly, in Table 8 we can see the same schedule broken out by container count. As Company B employs a system throughput Gantt chart to track containers that pass through each department throughout each shift, this data helps management make tactical decisions by allowing them to identify where attention should be placed to help keep the flow within a shift as level as possible. This data is also useful for troubleshooting process constraint issues as well as granting management visibility of which jobs are expected to be primary volume contributors by shift.

TABLE 7

| | | Shift production schedule (piece count) - jobs by department and shift. | | | | | | |
|---|---|---|---|---|---|---|---|---|
| | | Wed D Dec. 13, 2006 | | Thu B Dec. 14, 2006 | | Thu D Dec. 14, 2006 | | Fri B Dec. 15, 2006 | |
| | | Wave (Job) | Pieces | Wave (Job) | Pieces | Wave (Job) | Pieces | Wave (Job) | Pieces |
| P11 | | AFRR121302__APR | 7,432 | AFRE121102 | 17 | AFRR121301__AFR | 1,207 | AFRR121306__AFR | 1,572 |
| | | AFRR121303__AFR | 4,091 | AFRR121305__AFR | 4,217 | AFRR121304__AFR | 7,524 | | |
| Total P1 | | | 11,523 | | 4,234 | | 8,731 | | 1,572 |
| Total P3 | | | 0 | | 0 | | 0 | | 0 |
| | | AFRR121301__CLU | 4,575 | AFRR121306__CLU | 9,479 | AFRR121304__CLU | 23,549 | | |
| | | AFRR121302__CLU | 14,440 | KSG1217C__CLU | 20,945 | AFRR121305__CLU | 14,903 | | |
| | | AFRR121303__CLU | 7,641 | KSI1214B__CLU | 864 | KEQ146350 | 209 | | |
| | | KSGYL1217C__CLU | 935 | | | | | | |
| | | KSI1212C__CLU | 83 | | | | | | |
| | | PRP1211C | 3,025 | | | | | | |
| | | PRP1212A | 528 | | | | | | |
| | | PRP1215B | 17,398 | | | | | | |
| | | PRP1215D | 17,910 | | | | | | |
| | | PRPYL1215 | 3,027 | | | | | | |
| Total P6 | | | 69,562 | | 31,288 | | 38,661 | | 0 |
| | | DVD31212A | 48,000 | DVD31212A | 25,540 | | | | |
| Total P7 | | | 48,000 | | 25,540 | | 0 | | 0 |
| | | DVD21212A | 3,542 | DVD11212A | 48,000 | | | | |
| | | DVD11212A | 1,051 | | | | | | |
| Total P4 | | | 4,593 | | 48,000 | | 0 | | 0 |
| | | | | DVD41211A | 48,000 | DVD41211A | 14,651 | | |
| Total P5 | | | 0 | | 48,000 | | 14,651 | | 0 |
| | | DVD51214B1 | 37,344 | | | | | | |
| Total P12 | | | 37,344 | | 0 | | 0 | | 0 |
| | | | | DVD21212C | 48,000 | DVD21212C | 42,811 | | |
| | | | | | | DVD51212C3 | 55 | | |
| Total P2 | | | 0 | | 48,000 | | 42,866 | | 0 |
| | | | | BSGYL1217C | 935 | | | BSG1217C | 20,945 |
| | | | | BSI1208001 | 1 | | | MNG1213D | 18,558 |
| | | | | BSI1208002 | 103 | | | | |

TABLE 7-continued

Shift production schedule (piece count) - jobs by department and shift.

| | Wed D Dec. 13, 2006 | | Thu B Dec. 14, 2006 | | Thu D Dec. 14, 2006 | | Fri B Dec. 15, 2006 | |
|---|---|---|---|---|---|---|---|---|
| | Wave (Job) | Pieces | Wave (Job) | Pieces | Wave (Job) | Pieces | Wave (Job) | Pieces |
| | | | | | BSI1214B | 11,910 | | |
| | | | | | REQ146350 | 209 | | |
| Total P9 | | 0 | | 0 | | 13,158 | | 39,503 |
| Total P8 | | 0 | | 0 | | 0 | | 0 |
| | | | PMWN0729B | 8 | PMWN1213D | 1,549 | PMWN1213D2 | 3,252 |
| | | | PMWN1213D1 | 29,440 | PMWNOL1213 | 201,550 | | |
| Total P10 | | 0 | | 29,448 | | 203,099 | | 3,252 |
| Total | | 0 | | 0 | | 0 | | 0 |

As an additional feature, the total employee staffing requirements at each of the picking/processing departments have been added to help distribution operation management maneuver the labor force to support the production plan and can be found in Table 9. We can see here that although the staffing at any department may vary greatly from shift to shift, in this example the total employee staffing requirements across all departments varies by at most 4.6%.

TABLE 8

Shift production schedule (container count) - jobs by department and shift.

| | | Wed D Dec. 13, 2006 | | Thu B Dec. 14, 2006 | | Thu D Dec. 14, 2006 | | Fri B Dec. 15, 2006 | |
|---|---|---|---|---|---|---|---|---|---|
| | | Wave (Job) | Cartons | Wave (Job) | Cartons | Wave (Job) | Cartons | Wave (Job) | Cartons |
| | P11 | AFRR121302__AFR | 1,596 | AFRE121102 | 1 | AFRR121301__AFR | 746 | AFRR121306__AFR | 936 |
| | | AFRR121303__AFR | 1,173 | AFRR121305__AFR | 2,042 | AFRR121304__AFR | 2,612 | | |
| Total P1 | | | 2,769 | | 2,043 | | 3,358 | | 936 |
| Total P3 | | | 0 | | 0 | | 0 | | 0 |
| | | AFRR121301__CLU | 746 | AFRR121306__CLU | 1,872 | AFRR121304__CLU | 5,224 | | |
| | | AFRR121302__CLU | 3,192 | KSG1217C__CLU | 7,884 | AFRR121305__CLU | 4,084 | | |
| | | AFRR121303__CLU | 2,346 | KSI1214B__CLU | 263 | KEQ146350 | 10 | | |
| | | KSGYL1217C__CLU | 316 | | | | | | |
| | | KSI1212C__CLU | 20 | | | | | | |
| | | PRP1211C | 1,272 | | | | | | |
| | | PRP1212A | 510 | | | | | | |
| | | PRP1215B | 2,560 | | | | | | |
| | | PRP1215D | 2,636 | | | | | | |
| | | PRPYL1215 | 484 | | | | | | |
| Total P6 | | | 14,082 | | 10,019 | | 9,318 | | 0 |
| | | DVD31212A | 2,348 | DVD31212A | 1,249 | | | | |
| Total P7 | | | 2,348 | | 1,249 | | 0 | | 0 |
| | | DVD21212A | 421 | DVD11212A | 1,907 | | | | |
| | | DVD11212A | 42 | | | | | | |
| Total P4 | | | 463 | | 1,907 | | 0 | | 0 |
| | | | | DVD41211A | 1,826 | DVD41211A | 557 | | |
| Total P5 | | | 0 | | 1,826 | | 557 | | 0 |
| | | DVD51214B1 | 4,156 | | | | | | |
| Total P12 | | | 4,156 | | 0 | | 0 | | 0 |
| | | | | DVD21212C | 1,915 | DVD21212C | 1,708 | | |
| | | | | | | DVD51212C3 | 3 | | |
| Total P2 | | | 0 | | 1,915 | | 1,711 | | 0 |
| | | | | BSGYL1217C | 158 | BSG1217C | 3,942 | | |
| | | | | BSI1208001 | 1 | MNG1213D | 4,187 | | |
| | | | | BSI1208002 | 13 | | | | |

TABLE 8-continued

Shift production schedule (container count) - jobs by department and shift.

| | Wed D Dec. 13, 2006 | | Thu B Dec. 14, 2006 | | Thu D Dec. 14, 2006 | | Fri B Dec. 15, 2006 | |
|---|---|---|---|---|---|---|---|---|
| | Wave (Job) | Cartons | Wave (Job) | Cartons | Wave (Job) | Cartons | Wave (Job) | Cartons |
| | | | | | BSI1214B | 997 | | |
| | | | | | REQ146350 | 10 | | |
| Total P9 | | 0 | | 0 | | 1,179 | | 8,129 |
| Total P8 | | 0 | | 0 | | 0 | | 0 |
| | | | PMWN0729B | 1 | PMWN1213D | 4,958 | PMWN1213D2 | 9,041 |
| | | | PMWN1213D1 | 3,483 | PMWNOL1213 | 847 | | |
| Total P10 | | 0 | | 3,484 | | 5,805 | | 9,041 |
| Total | | 0 | | 0 | | 0 | | 0 |

TABLE 9

Total worker staffing requirements by department.

| | Staffing Requirements (number of employees) | | | |
|---|---|---|---|---|
| | Dec. 13, 2006 Wed D | Dec. 14, 2006 Thu B | Dec. 14, 2006 Thu D | Dec. 15, 2006 Fri B |
| P11 | 12 | 12 | 12 | 12 |
| P1 | 3 | 3 | 3 | 3 |
| P3 | 42 | 21 | 25 | 0 |
| P4/5/6/7/12 | 15 | 19 | 11 | 3 |
| P2 | 0 | 0 | 21 | 62 |
| P9 | 0 | 0 | 0 | 0 |
| P8 | 0 | 25 | 6 | 4 |
| P10 | 0 | 0 | 0 | 0 |
| M3 | 36 | 33 | 33 | 24 |
| Total | 108 | 113 | 111 | 108 |

The benefits from implementing this model fall into three primary categories. First and foremost, we will enjoy cost savings due to reduced staffing at the merge point M3 which is a result of less volatility in activity at this primary bottleneck. This is expected as we are moving towards a more balanced work schedule which will allow operations to experience improved productivity levels due to fewer changes in staffing on a shift by shift basis.

Secondly, we will see improved capacity utilization due to the "smoothing" effect of our scheduling model. Instead of having to maintain capacity for wide fluctuations in peak volumes, we have now effectively minimized these peaks resulting in improved capacity utilization.

Third, we will realize savings due to more product being able to flow through the entire process without expensive bypassing which will maximize the volume of product that flows through merge point M3 which will reduce transportation costs.

Figure 6:
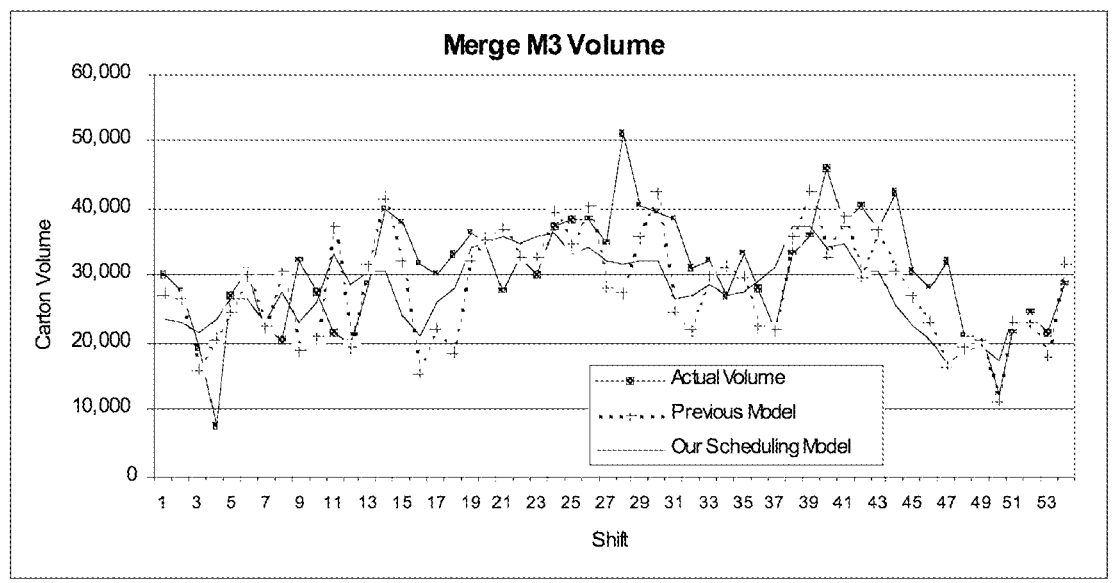
FIG. 6 is a plot of merge M3 carton volume, comparing actual volume with two scheduling models over a 54 shift time frame.

In FIG. 6 we can see actual historical container volume at merge point M3 for a 54 shift time frame (Nov. 10, 2006 through Dec. 12, 2006) as compared against the volume from the previous model and the volume that would have resulted using our model. It is noteworthy to point out the significant difference between the actual volume and the results from the previous model.

Similar to what can be found in most distribution environments across many companies, the previous scheduling model worked to manually fit aggregate workloads into full shift capacity "buckets" in an attempt to level load overall shift staffing levels. As this was accomplished without the benefit of any software this was truly an art form, heavily dependent on the skills of individuals within the production planning department.

Using this process there was no cost effective means of scheduling discrete jobs by department and shift and as a result, overall volume requirements were outlined for the operations management teams with few specific requirements. Consequently, there was often a tendency by the operation departments to work ahead and when the work ran out, to experience a lull in activity which created an "accordion" effect, resulting in exaggerated peaks and valleys in the previous model's volume.

Additionally, if we were to look past the effect on the individual department scheduling we would also see that as there was no previous visibility as to the effect the previous scheduling methods and "work ahead mentality" had on subsequent constraints such as merge point M3. Given this we are not surprised when we see the very noticeable difference between the previous model's volume line and the actual volume line.

An added benefit of our scheduling model which uses a more scientific approach is an improved ability to minimize this accordion effect through the scheduling of discrete jobs by department and shift. As our model is being used to schedule a rolling 4 shift horizon the net effect is a "smoothed" workload at merge point M3 as the jobs being planned change at each new planning event.

Figure 7:
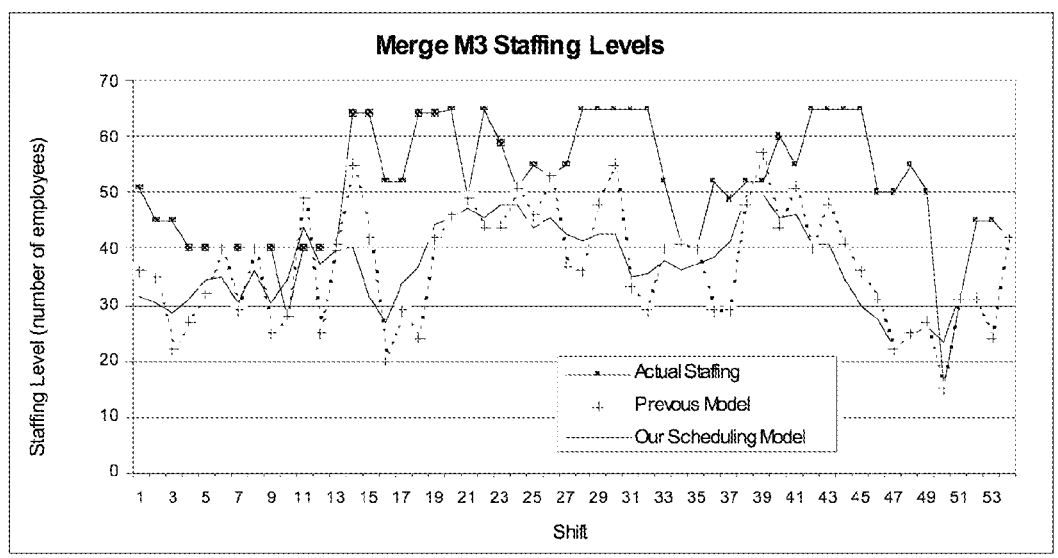
FIG. 7 is a plot of merge M3 staffing levels, comparing actual staffing with two scheduling models over a 54 shift time frame.

Likewise in FIG. 7 we can see the staffing levels (actual, previous model, our scheduling model) for the same time period and same merge point. Once again we can see the smoothing effect of our scheduling model.

One difference in the staffing comparison for merge point M3 (FIG. 7) as compared to the FIG. 6 is that in the staffing level chart we see a much wider gap between the actual and previous model staffing levels than we would expect given the gaps seen in FIG. 6. This is due largely to the high penalty for not completing work on schedule in this industry.

As discussed above, the prevalent product at Company B is very time sensitive with a very steep decay curve. Any service level failures at the distribution center (i.e. late shipments) would have the net effect of virtually eliminating the potential for realizing any revenue for new release titles.

As a result, we find that the management team in Company B operations has a strong tendency to over-react to volume spikes. As the volume swings become more significant, additional labor is often added as a safety factor in the absence of a more elegant scheduling and staffing solution, even though doing so has a significant impact on production costs.

We can see that the actual staffing trend loosely follows that of the previous model but is more exaggerated in its response to spikes in activity. Once again, using our scientific approach to scheduling, we end up with a plan that assigns discrete jobs to departments and individual shifts which stabilizes the staffing level as shown by the smoother line from our scheduling model.

To quantify these results we can review them by major category:

1. Reduced Staffing at Merge Point M3—Tabulating the over staffing results across the 51 shifts of actual data as shown in the FIG. 7 we find that the actual staffing requirement was 2,630 (average of 51.5 per shift) whereas our scheduling model resulted in only 1,904 (average of 37.3 per shift) for a net reduction in staffing levels of 726 employee-shifts which equates to 8,712 labor hours (at 12 paid hours per shift). Understanding that the data presented above was collected during the fall season which typically experiences higher volumes than others, we can deseasonalize this 8,712 labor hours by adjusting it down by 20%. If this deseasonalized value of 7,260 labor hours is annualized for 624 shifts per year this would translate to roughly an 88,828 labor hour reduction per year. Assuming a fully loaded labor rate of $14.00 per hour this equates to $1.24 million annually. Once again it should be pointed out that the results from the previous model (based in aggregate containers using individual expertise to develop a plan) created significant spikes in activity which resulted in a more exaggerated actual staffing level and reduced employee productivity through more frequent and larger staffing changes from shift to shift. Truly, the plan resulting from the previous model was not implementable. Also, as will be seen later, the previous scheduling model resulted in much poorer system utilization.

2. Improved Capacity—As the constraint on capacity utilization is measured by the peak capacity utilized, any reduction in the peak will free up additional excess capacity for other uses. In this instance the data shown above in FIG. 6 represents an actual maximum volume of 51,075 containers on a given shift whereas the previous model shows a maximum volume of 42,672 and our scheduling model returns a maximum of 37,355. Once again, the appropriate comparison should be made against the actual activity which yields a 36.7% increase in capacity. Comparing our scheduling model against the historical actuals is clearly more appropriate as history has shown that the previous scheduling model resulted in a plan that could not be achieved as evidenced by the very significant gap between the actual data and previous model data as presented in FIGS. 6 and 7. This increase in available capacity has the net result in reducing instances where product flow must bypass merge point M3 thereby minimizing the transportation costs.

3. Reduced Process Bypass—Bypassing the desired process flow occurs in an estimated 12 weeks out of 52 per year either as a planned or unplanned event and would require both additional labor for the special handling of containers shipped in addition to higher transportation costs. An estimated cost per bypass event is roughly $6,050 for labor (12 people per shift for 3 shifts per week of bypass at an estimated $14.00 labor rate) and $20,800 in freight charges, assuming 10,000 containers per bypass event resulting in a loss of consolidation only. Note that such an event would yield 10,000 containers shipped versus 1,667 if consolidation were utilized. This increase in containers shipped equates to an additional 8,333 containers shipped at $2.50 each. In total this equates to $26,850 per event, or roughly $322,200 annually in labor and transportation costs. Using our scheduling model would eliminate these process bypass events thus resulting in the annualized savings of $322,200 annually in labor and transportation costs.

In total these impacts net to over $1.5 million in annual savings while freeing up an additional 36% system capacity solely through the implementation of this new scheduling model which is rooted in Operations Research (OR) methodology.

In this application we have presented a unique scheduling model based in OR methodology which was designed, developed and implemented to plan discrete jobs to departments while allowing preferred departments by job, in addition to taking into consideration parallel departments competing for subsequent shared resources which have finite capacity. The impetus for the model design is important to understand as not only does the basic problem that existed at Company B continue to plague other companies, but there are also no tools currently available on the market which can address this need in the distribution arena. The primary objective of the model developed here was to minimize the total processing and transportation costs with a secondary goal of balancing the workload throughout the planning horizon. To the best of our knowledge this is the first model developed in theory and in practice to address this problem.

We have shown that not only does this model perform exceedingly well to the expectations presented, but that it is also capable of being run for a wide range of scenarios (shifts, parameter ranges, etc.) with very favorable computational times and objective function values that are close to optimal. We have seen that this model on its own is capable of reducing costs in this one application by over $1.5 million annually while increasing system capacity by over 36% without the addition of any physical process or equipment changes.

It is also expected that this basic model could easily be modified and applied to many other organizations with similar processes to yield desired results. As the Company B model as described in this application is more complex than most distribution processes it is anticipated that any application to other organizations would yield models that are less complex. Additionally, considering the run times afforded by using the CPLEX options as experienced in the live computational experiments, this model has proven to be very capable of handling much larger scheduling horizons than what was used in this application with very reasonable computational times and virtually no impact to the objective function values.

One facet of supply chain practitioners which is common across all organizations is the need and desire to continually reduce costs while maintaining or increasing capacities. This application presents to all supply chain practitioners how the correct application of OR methodology not only meets this need in practice, but that it is also flexible and robust enough for application to a variety of environments.

It may now be fully appreciated that the principles of the present invention provide a scheduling model for planning assignment of discrete jobs to multiple departments for shipment, wherein selected jobs are assignable to respective selected departments, and the departments share finite capacity resources. The model preferably includes a programmable computer system having loaded therein an objective function, and the computer system being operable to minimize a value of the objective function. The objective function comprises a sum of cost to ship containers in at least one of consolidated and unconsolidated forms, cost for each of a container equivalent not completed in a selected scheduling horizon, cost to process each job in each department, and cost for setup due to at least one of shift crossing and job splitting.

The cost to ship containers in at least one of consolidated and unconsolidated forms may be represented in the objective function by the expression $$P_1 \sum_{k=1}^{n} \sum_{i=1}^{r} X_{i,k,j1} + P_1 \sum_{k=1}^{n} \sum_{i=1}^{r} \sum_{j \in j2} \overline{X}_{i,k,j}$$

wherein $P_1$ is a shipping cost per container, i is a shift index number from 1 to r, j is a department index number from 1 to m, k is a job index number from 1 to n, $X_{i,k,j1}$ is a number of containers of job k processed in a selected merge department j1 during shift i, $\overline{X}_{i,k,j}$ is a number of containers of job k diverted direct to shipping from department j during shift i, and j2 is a subset of departments including the selected departments.

The cost for each of a container equivalent not completed in a selected scheduling horizon may be represented in the objective function by the expression $$\sum_{k=1}^{n} P_2 \frac{C_k}{B_k} \left( B_k - \sum_{j \in R} \sum_{i=1}^{r} Y_{ikj} \right)$$

wherein $P_2$ is a cost of shipping by an alternative mode of transportation, $C_k$ is a number of containers to be generated by job k, $B_k$ is a number of pieces to be shipped in job k, $Y_{ikj}$ is a number of pieces of job k shipped during shift i in department j, and R is a set of picking and processing departments other than merging or sorting departments.

The cost to process each job in each department may be represented in the objective function by the expression $$\sum_{j \in R} \sum_{k=1}^{n} \sum_{i=1}^{r} (d_{kj} Y_{ikj})$$

wherein $Y_{ikj}$ is a number of pieces of job k shipped during shift i in department j, and $d_{kj}$ is a unit cost to process job k in department j.

The cost for setup due to at least one of shift crossing and job splitting may be represented in the objective function by the expression $$P_3 \sum_{k=1}^{n} \sum_{i=1}^{r} M_{ik}$$

wherein $P_3$ is a setup cost accounting for labor needed to switch between jobs or shifts, and $M_{ik}$ is equal to 1 if job k is processed in shift i, and is equal to 0 if job k is not processed in shift i.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

APPENDIX A

Formulation

Objective function for Company B application:

$$\text{Min} \, 2.5 \sum_{k=1}^{n} \sum_{i=1}^{r} X_{i,k,M3} + \tag{1}$$

$$2.5 \sum_{k=1}^{n} \sum_{i=1}^{r} (\overline{X}_{i,k,M1} + \overline{X}_{i,k,M2} + \overline{X}_{i,k,S1} + \overline{X}_{i,k,S2} + \overline{X}_{i,k,M3}) +$$

$$\sum_{k=1}^{n} 6.0 \frac{C_k}{B_k} \left( B_k - \sum_{j \in R} \sum_{i=1}^{r} Y_{ikj} \right) +$$

$$\sum_{j \in R} \sum_{k=1}^{n} \sum_{i=1}^{r} (d_{kj} Y_{ikj}) + 20.0 \sum_{k=1}^{n} \sum_{i=1}^{r} M_{ik}.$$

Balance equations used in problem formulation:

$$X_{i,k,M4} = M_{i,k,P1} + X_{i,k,P2} + X_{i,k,P3} \, \forall \, i, k, \tag{2}$$

$$X_{i,k,M1} + \overline{X}_{i,k,M1} = X_{i,k,P8} + X_{i,k,M4} \, \forall \, i, k, \tag{3}$$

$$X_{i,k,M2} + \overline{X}_{i,k,M2} = X_{i,k,P9} + X_{i,k,M1} + X_{i,k,M3} \, \forall \, i, k, \tag{4}$$

$$X_{i,k,S1} + \overline{X}_{i,k,S1} + X_{i,k,M3} = X_{i,k,P10} + X_{i,k,M2} \, \forall \, i, k, \tag{5}$$

$$X_{i,k,M5} = X_{i,k,P4} + X_{i,k,P5} \, \forall \, i, k, \tag{6}$$

$$X_{i,k,M6} = X_{i,k,P6} + X_{i,k,P7} \, \forall \, i, k, \tag{7}$$

$$X_{i,k,S2} + \overline{X}_{i,k,S2} = X_{i,k,P11} + X_{i,k,M6} + X_{i,k,P12} + X_{i,k,S1} + X_{i,k,M5} \, \forall \, i, k, \tag{8}$$

$$6 a_i X_{i,k,M3} + \overline{X}_{i,k,M3} = X_{i,k,S2} \, \forall \, i, k. \tag{9}$$

Variables installed to level load work flow through the most prominent system bottleneck:

$$S \leq \sum_{k=1}^{n} (X_{i,k,M3} + \overline{X}_{i,k,M3} + X_{i,k,S2}) \, \forall \, i, \tag{10}$$

$$T \geq \sum_{k=1}^{n} (X_{i,k,M3} + \overline{X}_{i,k,M3} + X_{i,k,S2}) \, \forall \, i, \tag{11}$$

$$T - S \leq 500. \tag{12}$$

Processing/picking/merge/sortation constraints:

$$\sum_{k=1}^{n} (X_{i,k,P11} + X_{i,k,M6} + X_{i,k,P12}) \leq 60 \times 10.5 \times 60 \tag{13}$$

$$i = 1, 2, \ldots, r,$$

-continued $$\sum_{k=1}^{n}(X_{i,k,P6}+X_{i,k,P7}) \le 64 \times 10.5 \times 60 \tag{14}$$
$$i=1,2,\ldots,r,$$

$$\sum_{k=1}^{n}(X_{i,k,M5}+X_{i,k,S1}) \le 60 \times 10.5 \times 60 \tag{15}$$
$$i=1,2,\ldots,r,$$

$$\sum_{k=1}^{n}(X_{i,k,P4}+X_{i,k,P5}) \le 64 \times 10.5 \times 60 \tag{16}$$
$$i=1,2,\ldots,r,$$

$$\sum_{k=1}^{n}(X_{i,k,P8}+X_{i,k,M4}) \le 120 \times 10.5 \times 60 \tag{17}$$
$$i=1,2,\ldots,r,$$

$$\sum_{k=1}^{n}(X_{i,k,P1}+X_{i,k,P2}+X_{i,k,P3}) \le 40 \times 10.5 \times 60 \tag{18}$$
$$i=1,2,\ldots,r,$$

$$\sum_{k=1}^{n}(X_{i,k,M1}+X_{i,k,P9}+X_{i,k,M3}) \le 40 \times 10.5 \times 60 \tag{19}$$
$$i=1,2,\ldots,r,$$

$$\sum_{k=1}^{n}(X_{i,k,M2}+X_{i,k,P10}) \le 80 \times 10.5 \times 60 \tag{20}$$
$$i=1,2,\ldots,r,$$

$$\sum_{k=1}^{n}(X_{i,k,S1}+X_{i,k,M5}+X_{i,k,P11}+X_{i,k,M6}+X_{i,k,P12}) \le 120 \times 10.5 \times 60 \tag{21}$$
$$i=1,2,\ldots,r,$$

$$\sum_{k=1}^{n}X_{i,k,P8} \le 40 \times 10.5 \times 60 \tag{22}$$
$$i=1,2,\ldots,r,$$

$$\sum_{k=1}^{n}X_{i,k,M4} \le 40 \times 10.5 \times 60 \tag{23}$$
$$i=1,2,\ldots,r,$$

$$\sum_{k=1}^{n}X_{i,k,P1} \le 40 \times 10.5 \times 60 \tag{24}$$
$$i=1,2,\ldots,r,$$

$$\sum_{k=1}^{n}X_{i,k,P2} \le 40 \times 10.5 \times 60 \tag{25}$$
$$i=1,2,\ldots,r,$$

$$\sum_{k=1}^{n}Y_{i,k,P2} \le 65,000 \tag{25a}$$
$$i=1,2,\ldots,r,$$

$$\sum_{k=1}^{n}X_{i,k,P3} \le 40 \times 10.5 \times 60 \tag{26}$$
$$i=1,2,\ldots,r,$$

$$\sum_{k=1}^{n}X_{i,k,P9} \le 45 \times 10.5 \times 60 \tag{27}$$
$$i=1,2,\ldots,r,$$

$$\sum_{k=1}^{n}X_{i,k,P10} \le 40 \times 10.5 \times 60 \tag{28}$$
$$i=1,2,\ldots,r,$$

$$\sum_{k=1}^{n}X_{i,k,M5} \le 64 \times 10.5 \times 60 \tag{29}$$
$$i=1,2,\ldots,r,$$

$$\sum_{k=1}^{n}X_{i,k,P4} \le 64 \times 10.5 \times 60 \tag{30}$$
$$i=1,2,\ldots,r,$$

$$\sum_{k=1}^{n}X_{i,k,P5} \le 64 \times 10.5 \times 60 \tag{31}$$
$$i=1,2,\ldots,r,$$

$$\sum_{k=1}^{n}X_{i,k,P11} \le 7 \times 10.5 \times 60 \tag{32}$$
$$i=1,2,\ldots,r,$$

$$\sum_{k=1}^{n}Y_{i,k,P11} \le 40,000 \tag{32a}$$
$$i=1,2,\ldots,r,$$

$$\sum_{k=1}^{n}X_{i,k,M6} \le 64 \times 10.5 \times 60 \tag{33}$$
$$i=1,2,\ldots,r,$$

$$\sum_{k=1}^{n}X_{i,k,P6} \le 64 \times 10.5 \times 60 \tag{34}$$
$$i=1,2,\ldots,r,$$

$$\sum_{k=1}^{n}X_{i,k,P7} \le 64 \times 10.5 \times 60 \tag{35}$$
$$i=1,2,\ldots,r,$$

$$\sum_{k=1}^{n}X_{i,k,P12} \le 64 \times 10.5 \times 60 \tag{36}$$
$$i=1,2,\ldots,r,$$

$$\sum_{k=1}^{n}X_{i,k,M1} \le 120 \times 10.5 \times 60 \tag{37}$$
$$i=1,2,\ldots,r,$$

$$\sum_{k=1}^{n}X_{i,k,M2} \le 40 \times 10.5 \times 60 \tag{38}$$
$$i=1,2,\ldots,r,$$

$$\sum_{k=1}^{n}X_{i,k,S1} \le 80 \times 10.5 \times 60 \tag{39}$$
$$i=1,2,\ldots,r,$$

$$\sum_{k=1}^{n}X_{i,k,S2} \le 120 \times 10.5 \times 60 \tag{40}$$
$$i=1,2,\ldots,r,$$

-continued $$\sum_{k=1}^{n} X_{i,k,M3} \leq (35 \times 10.5 \times 60)a_j \quad (41)$$

$i = 1, 2, \ldots, r.$

Constraint added during implementation to allow containers for a particular job to bypass the normal product flow using parameter $b_k$:

$$\sum_{i=1}^{r} (\overline{X}_{i,k,M1} + \overline{X}_{i,k,M2} + \overline{X}_{i,k,S1} + \overline{X}_{i,k,S2}) \geq C_k b_k. \quad (41a)$$

Constraints used to force a job to a primary or secondary processing department:

$X_{i,k,j} \leq C_k N_k$ $j \in P(k)$ $\forall i,k$, where $P(k)$ is a set of primary processing department for job $k$, (42)

$X_{i,k,j} \leq C_k (1-N_k)$ $j \in S(k)$ $\forall i,k$, where $S(k)$ is a set of secondary processing department for job $k$, (43)

$Y_{i,k,j} \leq B_k N_k$ $j \in P(k)$ $\forall i,k$, where $P(k)$ is a set of primary processing department for job $k$, (44)

$Y_{i,k,j} \leq B_k (1-N_k)$ $j \in S(k)$ $\forall i,k$, where $S(k)$ is a set of secondary processing department for job $k$. (45)

Formulation used to force a job to a specific shift and to limit the number of shifts a job can be completed on to 2 or less:

$$\sum_{j \in Q(k)} X_{i,k,j} \leq C_k M_{i,k} q_{ik} \; j \in Q(k) \forall \, i, k, \quad (46)$$

$$\sum_{i=1}^{r} M_{i,k} \leq 2 \forall \, k, \quad (47)$$

$$\sum_{j \in Q(k)} Y_{i,k,j} \leq B_k M_{i,k} q_{ik} \; j \in Q(k) \forall \, i, k. \quad (48)$$

Constraints to prevent unnecessary job splitting assuming a 12 shift scheduling horizon:

$M_{1,k} + M_{1+h,k} \leq 1$ $\forall k$ $h=2, \ldots, 11$, (49)

$M_{2,k} + M_{2+h,k} \leq 1$ $\forall k$ $h=2, \ldots, 10$, (50)

$M_{3,k} + M_{3+h,k} \leq 1$ $\forall k$ $h=2, \ldots, 9$, (51)

$M_{4,k} + M_{4+h,k} \leq 1$ $\forall k$ $h=2, \ldots, 8$, (52)

$M_{5,k} + M_{5+h,k} \leq 1$ $\forall k$ $h=2, \ldots, 7$, (53)

$M_{6,k} + M_{6+h,k} \leq 1$ $\forall k$ $h=2, \ldots, 6$, (54)

$M_{7,k} + M_{7+h,k} \leq 1$ $\forall k$ $h=2, \ldots, 5$, (55)

$M_{8,k} + M_{8+h,k} \leq 1$ $\forall k$ $h=2, \ldots, 4$, (56)

$M_{9,k} + M_{9+h,k} \leq 1$ $\forall k$ $h=2,3$, (57)

$M_{10,k} + M_{12,k} \leq 1$ $\forall k$ $h=2$. (58)

Or more generally:

$M_{r-g,k} + M_{r-g+h,k} \leq 1$ $\forall k$ $r=1, \ldots, 12$ $g=2, \ldots, r-1$
$h=2, \ldots, g.$ (59)

Constraint to ensure a shift capacity (10.5 available hours during a 12 hour shift after breaks, lunches, start up meetings, etc. are considered) is not exceeded as well as a total staffing capacity where e represents the maximum staffing level allowed per shift:

$$\sum_{k=1}^{n} \frac{Y_{i,k,j}}{r_{k,j}} \leq 10.5 \forall \, i, j \quad (60)$$

$j \in h,$ $$\sum_{j \in h} \sum_{k=1}^{n} \frac{Y_{i,k,j}}{r_{k,j}} \leq 10.5 e \forall \, i. \quad (60a)$$

Constraint (61) requires that the pieces produced for job k in total are less than or equal to what is expected for job k. This constraint can be relaxed from equality since the objective function will prefer that $Y_{ikj}$ be as close to $B_k$ as possible.

$$\sum_{j \in h} \sum_{i=1}^{r} Y_{i,k,j} \leq B_k \quad (61)$$

$k = 1, 2, 3, \ldots, n.$

Constraint (62) requires that the containers produced for job k in total are less than or equal to what is expected for job k. This restriction can be relaxed from equality due to Constraint (64) where containers produced are tied directly to pieces produced (Constraint (61)) which is controlled by the objective function.

$$\sum_{j=1}^{m} \sum_{i=1}^{r} X_{i,k,j} \leq C_k \forall \, k. \quad (62)$$

Constraint used to ensure that the ratio of pieces completed per shift is similar to the ratio of containers $$X_{ikj}\left(\frac{B_k}{C_k}\right) - 0.5 \leq Y_{ikj} \leq X_{ikj}\left(\frac{B_k}{C_k}\right) + 0.5 \forall \, i, k, j. \quad (63)$$

APPENDIX B

Data Set for Computational Analysis

| | | | | | | | |
|---|---|---|---|---|---|---|---|
| Actual 4 shift data set for time period Dec. 13, 2006 through Dec. 15, 2006. | | | | | | | |
| Job (k) | Pool Point Departure Date | Job (Wave Name) | Infeed Group | # Pieces ($B_k$) | # Cartons ($C_k$) | Primary Processing Dept | Processing Time (hrs) ($p_{kj}$) |
| 1 | 15-Dec | AFRR121302_AFR | P11 | 7,432 | 1,596 | P11 | 17 |
| 2 | 15-Dec | AFRR121303_AFR | P11 | 4,091 | 1,173 | P11 | 10 |
| 3 | 15-Dec | AFRR121301_CLU | P3 | 4,575 | 746 | P3 | 37 |
| 4 | 15-Dec | AFRR121302_CLU | P3 | 14,440 | 3,192 | P3 | 116 |
| 5 | 15-Dec | AFRR121303_CLU | P3 | 7,641 | 2,346 | P3 | 61 |
| 6 | 15-Dec | KSGYL1217C_CLU | P3 | 935 | 316 | P3 | 7 |
| 7 | 15-Dec | KSI1212C_CLU | P3 | 83 | 20 | P3 | 1 |
| 8 | 15-Dec | PRP1211C | P3 | 3,025 | 1,272 | P3 | 24 |
| 9 | 15-Dec | PRP1212A | P3 | 528 | 510 | P3 | 4 |
| 10 | 15-Dec | PRP1215B | P3 | 17,398 | 2,560 | P3 | 139 |
| 11 | 15-Dec | PRP1215D | P3 | 17,910 | 2,636 | P3 | 143 |
| 12 | 15-Dec | PRPYL1215 | P3 | 3,027 | 484 | P3 | 24 |
| 13 | 15-Dec | DVD31212A | P6 | 73,540 | 3,597 | P6 | 210 |
| 14 | 15-Dec | DVD21212A | P7 | 3,542 | 421 | P7 | 10 |
| 15 | 15-Dec | DVD51214B1 | P5 | 37,344 | 4,156 | P5 | 107 |
| 16 | 15-Dec | AFRE121102 | P11 | 17 | 1 | P11 | 0 |
| 17 | 15-Dec | AFRR121305_AFR | P11 | 4,217 | 2,042 | P11 | 10 |
| 18 | 15-Dec | AFRR121306_CLU | P3 | 9,479 | 1,872 | P3 | 76 |
| 19 | 15-Dec | KSG1217C_CLU | P3 | 20,945 | 7,884 | P3 | 168 |
| 20 | 15-Dec | KSI1214B_CLU | P3 | 864 | 263 | P3 | 7 |
| 21 | 15-Dec | DVD11212A | P7 | 49,051 | 1,949 | P7 | 140 |
| 22 | 15-Dec | DVD41211A | P4 | 62,651 | 2,383 | P4 | 179 |
| 23 | 15-Dec | DVD21212C | P12 | 90,811 | 3,623 | P12 | 259 |
| 24 | 15-Dec | PMWN0729B | P8 | 8 | 1 | P8 | 0 |
| 25 | 15-Dec | PMWN1213D1 | P8 | 29,440 | 3,483 | P8 | 346 |
| 26 | 15-Dec | AFRR121301_AFR | P11 | 1,207 | 746 | P11 | 3 |
| 27 | 15-Dec | AFRR121304_AFR | P11 | 7,524 | 2,612 | P11 | 18 |
| 28 | 15-Dec | AFRR121304_CLU | P3 | 23,549 | 5,224 | P3 | 188 |
| 29 | 15-Dec | AFRR121305_CLU | P3 | 14,903 | 4,084 | P3 | 119 |
| 30 | 15-Dec | KEQ146350 | P3 | 209 | 10 | P3 | 2 |
| 31 | 15-Dec | DVD51212C3 | P12 | 55 | 3 | P12 | 0 |
| 32 | 15-Dec | BSGYL1217C | P2 | 935 | 158 | P2 | 14 |
| 33 | 15-Dec | BSI1208001 | P2 | 1 | 1 | P2 | 0 |
| 34 | 15-Dec | BSI1208002 | P2 | 103 | 13 | P2 | 2 |
| 35 | 15-Dec | BSI1214B | P2 | 11,910 | 997 | P2 | 183 |
| 36 | 15-Dec | REQ146350 | P2 | 209 | 10 | P2 | 3 |
| 37 | 15-Dec | PMWN1213D | P8 | 4,958 | 1,549 | P8 | 58 |
| 38 | 15-Dec | PMWNOL1213 | P8 | 201,550 | 847 | P8 | 2,371 |
| 39 | 15-Dec | AFRR121306_AFR | P11 | 1,572 | 936 | P11 | 4 |
| 40 | 15-Dec | BSG1217C | P2 | 20,945 | 3,942 | P2 | 322 |
| 41 | 15-Dec | MNG1213D | P2 | 18,558 | 4,187 | P2 | 286 |
| 42 | 15-Dec | PMWN1213D2 | P8 | 9,041 | 3,252 | P8 | 106 |

| Job (k) | Processing Rate (pcs/hr) ($r_{kj}$) | Processing Cost ($/pc) ($d_{kj}$) | Secondary Processing Dept | Processing Time (hrs) ($p_{kj}$) | Processing Rate (pcs/hr) ($r_{kj}$) | Processing Cost ($/pc) ($d_{kj}$) |
|---|---|---|---|---|---|---|
| 1 | 425 | 0.0348 | P3 | 59 | 125 | 0.1184 |
| 2 | 425 | 0.0348 | P3 | 33 | 125 | 0.1184 |
| 3 | 125 | 0.1184 | na | — | — | — |
| 4 | 125 | 0.1184 | na | — | — | — |
| 5 | 125 | 0.1184 | na | — | — | — |
| 6 | 125 | 0.1184 | na | — | — | — |
| 7 | 125 | 0.1184 | na | — | — | — |
| 8 | 125 | 0.1184 | na | — | — | — |
| 9 | 125 | 0.1184 | na | — | — | — |
| 10 | 125 | 0.1184 | na | — | — | — |
| 11 | 125 | 0.1184 | na | — | — | — |
| 12 | 125 | 0.1184 | na | — | — | — |
| 13 | 350 | 0.0423 | P2 | 1,131 | 65 | 0.2277 |
| 14 | 350 | 0.0423 | P2 | 54 | 65 | 0.2277 |
| 15 | 350 | 0.0423 | P2 | 575 | 65 | 0.2277 |
| 16 | 425 | 0.0348 | P3 | 0 | 125 | 0.1184 |
| 17 | 425 | 0.0348 | P3 | 34 | 125 | 0.1184 |
| 18 | 125 | 0.1184 | na | — | — | — |
| 19 | 125 | 0.1184 | na | — | — | — |
| 20 | 125 | 0.1184 | na | — | — | — |
| 21 | 350 | 0.0423 | P2 | 755 | 65 | 0.2277 |
| 22 | 350 | 0.0423 | P2 | 964 | 65 | 0.2277 |

-continued

Actual 4 shift data set for time period Dec. 13, 2006 through Dec. 15, 2006.

|    |     |        |     |       |     |        |
|----|-----|--------|-----|-------|-----|--------|
| 23 | 350 | 0.0423 | P2  | 1,397 | 65  | 0.2277 |
| 24 | 85  | 0.1741 | P10 | 0     | 55  | 0.2691 |
| 25 | 85  | 0.1741 | P10 | 535   | 55  | 0.2691 |
| 26 | 425 | 0.0348 | P3  | 10    | 125 | 0.1184 |
| 27 | 425 | 0.0348 | P3  | 60    | 125 | 0.1184 |
| 28 | 125 | 0.1184 | na  | —     | —   | —      |
| 29 | 125 | 0.1184 | na  | —     | —   | —      |
| 30 | 125 | 0.1184 | na  | —     | —   | —      |
| 31 | 350 | 0.0423 | P2  | 1     | 65  | 0.2277 |
| 32 | 65  | 0.2277 | na  | —     | —   | —      |
| 33 | 65  | 0.2277 | na  | —     | —   | —      |
| 34 | 65  | 0.2277 | na  | —     | —   | —      |
| 35 | 65  | 0.2277 | na  | —     | —   | —      |
| 36 | 65  | 0.2277 | na  | —     | —   | —      |
| 37 | 85  | 0.1741 | P10 | 90    | 55  | 0.2691 |
| 38 | 85  | 0.1741 | P10 | 3,665 | 55  | 0.2691 |
| 39 | 425 | 0.0348 | P3  | 13    | 125 | 0.1184 |
| 40 | 65  | 0.2277 | na  | —     | —   | —      |
| 41 | 65  | 0.2277 | na  | —     | —   | —      |
| 42 | 85  | 0.1741 | P10 | 164   | 55  | 0.2691 |

APPENDIX C

Data Set for 12 Shift Plan Based on Forecasted Data

Forecasted 12 shift data set for time period Dec. 13, 2006 through Dec. 19, 2006.

| Job (k) | Pool Point Departure Date | Job (Wave Name) | Infeed Group | # Pieces ($B_k$) | # Cartons ($C_k$) | Primary Processing Dept | Processing Time (hrs) ($p_{kj}$) |
|---|---|---|---|---|---|---|---|
| 1  | NA | Job 1  | P11 | 7,432   | 1,596 | P11 | 17    |
| 2  | NA | Job 2  | P11 | 4,091   | 1,173 | P11 | 10    |
| 3  | NA | Job 3  | P3  | 4,575   | 746   | P3  | 37    |
| 4  | NA | Job 4  | P3  | 14,440  | 3,192 | P3  | 116   |
| 5  | NA | Job 5  | P3  | 7,641   | 2,346 | P3  | 61    |
| 6  | NA | Job 6  | P3  | 935     | 316   | P3  | 7     |
| 7  | NA | Job 7  | P3  | 83      | 20    | P3  | 1     |
| 8  | NA | Job 8  | P3  | 3,025   | 1,272 | P3  | 24    |
| 9  | NA | Job 9  | P3  | 528     | 510   | P3  | 4     |
| 10 | NA | Job 10 | P3  | 17,398  | 2,560 | P3  | 139   |
| 11 | NA | Job 11 | P3  | 17,910  | 2,636 | P3  | 143   |
| 12 | NA | Job 12 | P3  | 3,027   | 484   | P3  | 24    |
| 13 | NA | Job 13 | P6  | 73,540  | 3,597 | P6  | 210   |
| 14 | NA | Job 14 | P7  | 3,542   | 421   | P7  | 10    |
| 15 | NA | Job 15 | P5  | 37,344  | 4,156 | P5  | 107   |
| 16 | NA | Job 16 | P11 | 17      | 1     | P11 | 0     |
| 17 | NA | Job 17 | P11 | 4,217   | 2,042 | P11 | 10    |
| 18 | NA | Job 18 | P3  | 9,479   | 1,872 | P3  | 76    |
| 19 | NA | Job 19 | P3  | 20,945  | 7,884 | P3  | 168   |
| 20 | NA | Job 20 | P3  | 864     | 263   | P3  | 7     |
| 21 | NA | Job 21 | P7  | 49,051  | 1,949 | P7  | 140   |
| 22 | NA | Job 22 | P4  | 62,651  | 2,383 | P4  | 179   |
| 23 | NA | Job 23 | P12 | 90,811  | 3,623 | P12 | 259   |
| 24 | NA | Job 24 | P8  | 8       | 1     | P8  | 0     |
| 25 | NA | Job 25 | P8  | 29,440  | 3,483 | P8  | 346   |
| 26 | NA | Job 26 | P11 | 1,207   | 746   | P11 | 3     |
| 27 | NA | Job 27 | P11 | 7,524   | 2,612 | P11 | 18    |
| 28 | NA | Job 28 | P3  | 23,549  | 5,224 | P3  | 188   |
| 29 | NA | Job 29 | P3  | 14,903  | 4,084 | P3  | 119   |
| 30 | NA | Job 30 | P3  | 209     | 10    | P3  | 2     |
| 31 | NA | Job 31 | P12 | 55      | 3     | P12 | 0     |
| 32 | NA | Job 32 | P2  | 935     | 158   | P2  | 14    |
| 33 | NA | Job 33 | P2  | 1       | 1     | P2  | 0     |
| 34 | NA | Job 34 | P2  | 103     | 13    | P2  | 2     |
| 35 | NA | Job 35 | P2  | 11,910  | 997   | P2  | 183   |
| 36 | NA | Job 36 | P2  | 209     | 10    | P2  | 3     |
| 37 | NA | Job 37 | P8  | 4,958   | 1,549 | P8  | 58    |
| 38 | NA | Job 38 | P8  | 201,550 | 847   | P8  | 2,371 |
| 39 | NA | Job 39 | P11 | 1,572   | 936   | P11 | 4     |
| 40 | NA | Job 40 | P2  | 20,945  | 3,942 | P2  | 322   |
| 41 | NA | Job 41 | P2  | 18,558  | 4,187 | P2  | 286   |

-continued

Forecasted 12 shift data set for time period Dec. 13, 2006 through Dec. 19, 2006.

| | | | | | | | |
|---|---|---|---|---|---|---|---|
| 42 | NA | Job 42 | P8 | 9,041 | 3,252 | P8 | 106 |
| 43 | NA | Job 43 | P11 | 7,432 | 1,596 | P11 | 17 |
| 44 | NA | Job 44 | P11 | 4,091 | 1,173 | P11 | 10 |
| 45 | NA | Job 45 | P3 | 4,575 | 746 | P3 | 37 |
| 46 | NA | Job 46 | P3 | 14,440 | 3,192 | P3 | 116 |
| 47 | NA | Job 47 | P3 | 7,641 | 2,346 | P3 | 61 |
| 48 | NA | Job 48 | P3 | 935 | 316 | P3 | 7 |
| 49 | NA | Job 49 | P3 | 83 | 20 | P3 | 1 |
| 50 | NA | Job 50 | P3 | 3,025 | 1,272 | P3 | 24 |
| 51 | NA | Job 51 | P3 | 528 | 510 | P3 | 4 |
| 52 | NA | Job 52 | P3 | 17,398 | 2,560 | P3 | 139 |
| 53 | NA | Job 53 | P3 | 17,910 | 2,636 | P3 | 143 |
| 54 | NA | Job 54 | P3 | 3,027 | 484 | P3 | 24 |
| 55 | NA | Job 55 | P6 | 73,540 | 3,597 | P6 | 210 |
| 56 | NA | Job 56 | P7 | 3,542 | 421 | P7 | 10 |
| 57 | NA | Job 57 | P5 | 37,344 | 4,156 | P5 | 107 |
| 58 | NA | Job 58 | P11 | 17 | 1 | P11 | 0 |
| 59 | NA | Job 59 | P11 | 4,217 | 2,042 | P11 | 10 |
| 60 | NA | Job 60 | P3 | 9,479 | 1,872 | P3 | 76 |
| 61 | NA | Job 61 | P3 | 20,945 | 7,884 | P3 | 168 |
| 62 | NA | Job 62 | P3 | 864 | 263 | P3 | 7 |
| 63 | NA | Job 63 | P7 | 49,051 | 1,949 | P7 | 140 |
| 64 | NA | Job 64 | P4 | 62,651 | 2,383 | P4 | 179 |
| 65 | NA | Job 65 | P12 | 90,811 | 3,623 | P12 | 259 |
| 66 | NA | Job 66 | P8 | 8 | 1 | P8 | 0 |
| 67 | NA | Job 67 | P8 | 29,440 | 3,483 | P8 | 346 |
| 68 | NA | Job 68 | P11 | 1,207 | 746 | P11 | 3 |
| 69 | NA | Job 69 | P11 | 7,524 | 2,612 | P11 | 18 |
| 70 | NA | Job 70 | P3 | 23,549 | 5,224 | P3 | 188 |
| 71 | NA | Job 71 | P3 | 14,903 | 4,084 | P3 | 119 |
| 72 | NA | Job 72 | P3 | 209 | 10 | P3 | 2 |
| 73 | NA | Job 73 | P12 | 55 | 3 | P12 | 0 |
| 74 | NA | Job 74 | P2 | 935 | 158 | P2 | 14 |
| 75 | NA | Job 75 | P2 | 1 | 1 | P2 | 0 |
| 76 | NA | Job 76 | P2 | 103 | 13 | P2 | 2 |
| 77 | NA | Job 77 | P2 | 11,910 | 997 | P2 | 183 |
| 78 | NA | Job 78 | P2 | 209 | 10 | P2 | 3 |
| 79 | NA | Job 79 | P8 | 4,958 | 1,549 | P8 | 58 |
| 80 | NA | Job 80 | P8 | 201,550 | 847 | P8 | 2,371 |
| 81 | NA | Job 81 | P11 | 1,572 | 936 | P11 | 4 |
| 82 | NA | Job 82 | P2 | 20,945 | 3,942 | P2 | 322 |
| 83 | NA | Job 83 | P2 | 18,558 | 4,187 | P2 | 286 |

| Job (k) | Processing Rate (pcs/hr) ($r_{kj}$) | Processing Cost($/pc) ($d_{kj}$) | Secondary Processing Dept | Processing Time (hrs) ($p_{kj}$) | Processing Rate (pcs/hr) ($r_{kj}$) | Processing Cost($/pc) ($d_{kj}$) |
|---|---|---|---|---|---|---|
| 1 | 425 | 0.0348 | P3 | 59 | 125 | 0.1184 |
| 2 | 425 | 0.0348 | P3 | 33 | 125 | 0.1184 |
| 3 | 125 | 0.1184 | na | — | — | — |
| 4 | 125 | 0.1184 | na | — | — | — |
| 5 | 125 | 0.1184 | na | — | — | — |
| 6 | 125 | 0.1184 | na | — | — | — |
| 7 | 125 | 0.1184 | na | — | — | — |
| 8 | 125 | 0.1184 | na | — | — | — |
| 9 | 125 | 0.1184 | na | — | — | — |
| 10 | 125 | 0.1184 | na | — | — | — |
| 11 | 125 | 0.1184 | na | — | — | — |
| 12 | 125 | 0.1184 | na | — | — | — |
| 13 | 350 | 0.0423 | P2 | 1,131 | 65 | 0.2277 |
| 14 | 350 | 0.0423 | P2 | 54 | 65 | 0.2277 |
| 15 | 350 | 0.0423 | P2 | 575 | 65 | 0.2277 |
| 16 | 425 | 0.0348 | P3 | 0 | 125 | 0.1184 |
| 17 | 425 | 0.0348 | P3 | 34 | 125 | 0.1184 |
| 18 | 125 | 0.1184 | na | — | — | — |
| 19 | 125 | 0.1184 | na | — | — | — |
| 20 | 125 | 0.1184 | na | — | — | — |
| 21 | 350 | 0.0423 | P2 | 755 | 65 | 0.2277 |
| 22 | 350 | 0.0423 | P2 | 964 | 65 | 0.2277 |
| 23 | 350 | 0.0423 | P2 | 1,397 | 65 | 0.2277 |
| 24 | 85 | 0.1741 | P10 | 0 | 55 | 0.2691 |
| 25 | 85 | 0.1741 | P10 | 535 | 55 | 0.2691 |
| 26 | 425 | 0.0348 | P3 | 10 | 125 | 0.1184 |
| 27 | 425 | 0.0348 | P3 | 60 | 125 | 0.1184 |
| 28 | 125 | 0.1184 | na | — | — | — |
| 29 | 125 | 0.1184 | na | — | — | — |
| 30 | 125 | 0.1184 | na | — | — | — |

-continued

Forecasted 12 shift data set for time period Dec. 13, 2006 through Dec. 19, 2006.

| | | | | | | |
|---|---|---|---|---|---|---|
| 31 | 350 | 0.0423 | P2  | 1     | 65  | 0.2277 |
| 32 | 65  | 0.2277 | na  | —     | —   | —      |
| 33 | 65  | 0.2277 | na  | —     | —   | —      |
| 34 | 65  | 0.2277 | na  | —     | —   | —      |
| 35 | 65  | 0.2277 | na  | —     | —   | —      |
| 36 | 65  | 0.2277 | na  | —     | —   | —      |
| 37 | 85  | 0.1741 | P10 | 90    | 55  | 0.2691 |
| 38 | 85  | 0.1741 | P10 | 3,665 | 55  | 0.2691 |
| 39 | 425 | 0.0348 | P3  | 13    | 125 | 0.1184 |
| 40 | 65  | 0.2277 | na  | —     | —   | —      |
| 41 | 65  | 0.2277 | na  | —     | —   | —      |
| 42 | 85  | 0.1741 | P10 | 164   | 55  | 0.2691 |
| 43 | 425 | 0.0348 | P3  | 59    | 125 | 0.1184 |
| 44 | 425 | 0.0348 | P3  | 33    | 125 | 0.1184 |
| 45 | 125 | 0.1184 | na  | —     | —   | —      |
| 46 | 125 | 0.1184 | na  | —     | —   | —      |
| 47 | 125 | 0.1184 | na  | —     | —   | —      |
| 48 | 125 | 0.1184 | na  | —     | —   | —      |
| 49 | 125 | 0.1184 | na  | —     | —   | —      |
| 50 | 125 | 0.1184 | na  | —     | —   | —      |
| 51 | 125 | 0.1184 | na  | —     | —   | —      |
| 52 | 125 | 0.1184 | na  | —     | —   | —      |
| 53 | 125 | 0.1184 | na  | —     | —   | —      |
| 54 | 125 | 0.1184 | na  | —     | —   | —      |
| 55 | 350 | 0.0423 | P2  | 1,131 | 65  | 0.2277 |
| 56 | 350 | 0.0423 | P2  | 54    | 65  | 0.2277 |
| 57 | 350 | 0.0423 | P2  | 575   | 65  | 0.2277 |
| 58 | 425 | 0.0348 | P3  | 0     | 125 | 0.1184 |
| 59 | 425 | 0.0348 | P3  | 34    | 125 | 0.1184 |
| 60 | 125 | 0.1184 | na  | —     | —   | —      |
| 61 | 125 | 0.1184 | na  | —     | —   | —      |
| 62 | 125 | 0.1184 | na  | —     | —   | —      |
| 63 | 350 | 0.0423 | P2  | 755   | 65  | 0.2277 |
| 64 | 350 | 0.0423 | P2  | 964   | 65  | 0.2277 |
| 65 | 350 | 0.0423 | P2  | 1,397 | 65  | 0.2277 |
| 66 | 85  | 0.1741 | P10 | 0     | 55  | 0.2691 |
| 67 | 85  | 0.1741 | P10 | 535   | 55  | 0.2691 |
| 68 | 425 | 0.0348 | P3  | 10    | 125 | 0.1184 |
| 69 | 425 | 0.0348 | P3  | 60    | 125 | 0.1184 |
| 70 | 125 | 0.1184 | na  | —     | —   | —      |
| 71 | 125 | 0.1184 | na  | —     | —   | —      |
| 72 | 125 | 0.1184 | na  | —     | —   | —      |
| 73 | 350 | 0.0423 | P2  | 1     | 65  | 0.2277 |
| 74 | 65  | 0.2277 | na  | —     | —   | —      |
| 75 | 65  | 0.2277 | na  | —     | —   | —      |
| 76 | 65  | 0.2277 | na  | —     | —   | —      |
| 77 | 65  | 0.2277 | na  | —     | —   | —      |
| 78 | 65  | 0.2277 | na  | —     | —   | —      |
| 79 | 85  | 0.1741 | P10 | 90    | 55  | 0.2691 |
| 80 | 85  | 0.1741 | P10 | 3,665 | 55  | 0.2691 |
| 81 | 425 | 0.0348 | P3  | 13    | 125 | 0.1184 |
| 82 | 65  | 0.2277 | na  | —     | —   | —      |
| 83 | 65  | 0.2277 | na  | —     | —   | —      |

APPENDIX C

50

Data Set for 12 Shift Plan Based on Forecasted Data
(Continued)

Forecasted 12 shift data set for time period Dec. 13, 2006 through Dec. 19, 2006.

| Job (k) | Pool Point Departure Date | Job (Wave Name) | Infeed Group | # Pieces ($B_k$) | # Cartons ($C_k$) | Primary Processing Dept | Processing Time (hrs) ($p_{kj}$) |
|---|---|---|---|---|---|---|---|
| 84 | NA | Job 84 | P8  | 9,041  | 3,252 | P8  | 106 |
| 85 | NA | Job 85 | P11 | 7,432  | 1,596 | P11 | 17  |
| 86 | NA | Job 86 | P11 | 4,091  | 1,173 | P11 | 10  |
| 87 | NA | Job 87 | P3  | 4,575  | 746   | P3  | 37  |
| 88 | NA | Job 88 | P3  | 14,440 | 3,192 | P3  | 116 |
| 89 | NA | Job 89 | P3  | 7,641  | 2,346 | P3  | 61  |
| 90 | NA | Job 90 | P3  | 935    | 316   | P3  | 7   |

-continued

Forecasted 12 shift data set for time period Dec. 13, 2006 through Dec. 19, 2006.

| | | | | | | | |
|---|---|---|---|---|---|---|---|
| 91 | NA | Job 91 | P3 | 83 | 20 | P3 | 1 |
| 92 | NA | Job 92 | P3 | 3,025 | 1,272 | P3 | 24 |
| 93 | NA | Job 93 | P3 | 528 | 510 | P3 | 4 |
| 94 | NA | Job 94 | P3 | 17,398 | 2,560 | P3 | 139 |
| 95 | NA | Job 95 | P3 | 17,910 | 2,636 | P3 | 143 |
| 96 | NA | Job 96 | P3 | 3,027 | 484 | P3 | 24 |
| 97 | NA | Job 97 | P6 | 73,540 | 3,597 | P6 | 210 |
| 98 | NA | Job 98 | P7 | 3,542 | 421 | P7 | 10 |
| 99 | NA | Job 99 | P5 | 37,344 | 4,156 | P5 | 107 |
| 100 | NA | Job 100 | P11 | 17 | 1 | P11 | 0 |
| 101 | NA | Job 101 | P11 | 4,217 | 2,042 | P11 | 10 |
| 102 | NA | Job 102 | P3 | 9,479 | 1,872 | P3 | 76 |
| 103 | NA | Job 103 | P3 | 20,945 | 7,884 | P3 | 168 |
| 104 | NA | Job 104 | P3 | 864 | 263 | P3 | 7 |
| 105 | NA | Job 105 | P7 | 49,051 | 1,949 | P7 | 140 |
| 106 | NA | Job 106 | P4 | 62,651 | 2,383 | P4 | 179 |
| 107 | NA | Job 107 | P12 | 90,811 | 3,623 | P12 | 259 |
| 108 | NA | Job 108 | P8 | 8 | 1 | P8 | 0 |
| 109 | NA | Job 109 | P8 | 29,440 | 3,483 | P8 | 346 |
| 110 | NA | Job 110 | P11 | 1,207 | 746 | P11 | 3 |
| 111 | NA | Job 111 | P11 | 7,524 | 2,612 | P11 | 18 |
| 112 | NA | Job 112 | P3 | 23,549 | 5,224 | P3 | 188 |
| 113 | NA | Job 113 | P3 | 14,903 | 4,084 | P3 | 119 |
| 114 | NA | Job 114 | P3 | 209 | 10 | P3 | 2 |
| 115 | NA | Job 115 | P12 | 55 | 3 | P12 | 0 |
| 116 | NA | Job 116 | P2 | 935 | 158 | P2 | 14 |
| 117 | NA | Job 117 | P2 | 1 | 1 | P2 | 0 |
| 118 | NA | Job 118 | P2 | 103 | 13 | P2 | 2 |
| 119 | NA | Job 119 | P2 | 11,910 | 997 | P2 | 183 |
| 120 | NA | Job 120 | P2 | 209 | 10 | P2 | 3 |
| 121 | NA | Job 121 | P8 | 4,958 | 1,549 | P8 | 58 |
| 122 | NA | Job 122 | P8 | 201,550 | 847 | P8 | 2,371 |
| 123 | NA | Job 123 | P11 | 1,572 | 936 | P11 | 4 |
| 124 | NA | Job 124 | P2 | 20,945 | 3,942 | P2 | 322 |
| 125 | NA | Job 125 | P2 | 18,558 | 4,187 | P2 | 286 |
| 126 | NA | Job 126 | P8 | 9,041 | 3,252 | P8 | 106 |

| Job (k) | Processing Rate (pcs/hr) ($r_{kj}$) | Processing Cost ($/pc) ($d_{kj}$) | Secondary Processing Dept | Processing Time (hrs) ($p_{kj}$) | Processing Rate (pcs/hr) ($r_{kj}$) | Processing Cost ($/pc) ($d_{kj}$) |
|---|---|---|---|---|---|---|
| 84 | 85 | 0.1741 | P10 | 164 | 55 | 0.2691 |
| 85 | 425 | 0.0348 | P3 | 59 | 125 | 0.1184 |
| 86 | 425 | 0.0348 | P3 | 33 | 125 | 0.1184 |
| 87 | 125 | 0.1184 | na | — | — | — |
| 88 | 125 | 0.1184 | na | — | — | — |
| 89 | 125 | 0.1184 | na | — | — | — |
| 90 | 125 | 0.1184 | na | — | — | — |
| 91 | 125 | 0.1184 | na | — | — | — |
| 92 | 125 | 0.1184 | na | — | — | — |
| 93 | 125 | 0.1184 | na | — | — | — |
| 94 | 125 | 0.1184 | na | — | — | — |
| 95 | 125 | 0.1184 | na | — | — | — |
| 96 | 125 | 0.1184 | na | — | — | — |
| 97 | 350 | 0.0423 | P2 | 1,131 | 65 | 0.2277 |
| 98 | 350 | 0.0423 | P2 | 54 | 65 | 0.2277 |
| 99 | 350 | 0.0423 | P2 | 575 | 65 | 0.2277 |
| 100 | 425 | 0.0348 | P3 | 0 | 125 | 0.1184 |
| 101 | 425 | 0.0348 | P3 | 34 | 125 | 0.1184 |
| 102 | 125 | 0.1184 | na | — | — | — |
| 103 | 125 | 0.1184 | na | — | — | — |
| 104 | 125 | 0.1184 | na | — | — | — |
| 105 | 350 | 0.0423 | P2 | 755 | 65 | 0.2277 |
| 106 | 350 | 0.0423 | P2 | 964 | 65 | 0.2277 |
| 107 | 350 | 0.0423 | P2 | 1,397 | 65 | 0.2277 |
| 108 | 85 | 0.1741 | P10 | 0 | 55 | 0.2691 |
| 109 | 85 | 0.1741 | P10 | 535 | 55 | 0.2691 |
| 110 | 425 | 0.0348 | P3 | 10 | 125 | 0.1184 |
| 111 | 425 | 0.0348 | P3 | 60 | 125 | 0.1184 |
| 112 | 125 | 0.1184 | na | — | — | — |
| 113 | 125 | 0.1184 | na | — | — | — |
| 114 | 125 | 0.1184 | na | — | — | — |
| 115 | 350 | 0.0423 | P2 | 1 | 65 | 0.2277 |
| 116 | 65 | 0.2277 | na | — | — | — |
| 117 | 65 | 0.2277 | na | — | — | — |
| 118 | 65 | 0.2277 | na | — | — | — |
| 119 | 65 | 0.2277 | na | — | — | — |

-continued

| \multicolumn{7}{c}{Forecasted 12 shift data set for time period Dec. 13, 2006 through Dec. 19, 2006.} |
|---|---|---|---|---|---|---|
| 120 | 65 | 0.2277 | na | — | — | — |
| 121 | 85 | 0.1741 | P10 | 90 | 55 | 0.2691 |
| 122 | 85 | 0.1741 | P10 | 3,665 | 55 | 0.2691 |
| 123 | 425 | 0.0348 | P3 | 13 | 125 | 0.1184 |
| 124 | 65 | 0.2277 | na | — | — | — |
| 125 | 65 | 0.2277 | na | — | — | — |
| 126 | 85 | 0.1741 | P10 | 164 | 55 | 0.2691 |

What is claimed is:

1. A scheduling model system for planning assignment of discrete jobs to multiple departments for shipment, wherein selected jobs are assignable to respective selected departments, and the departments share finite capacity resources, the model comprising:
 a programmable computer system having loaded therein an objective function, and the computer system minimizes a value of the objective function; and
 wherein the objective function comprises a sum of cost to ship containers in at least one of consolidated and unconsolidated forms, cost for each of a container equivalent that is not completed in a selected scheduling horizon, cost to process each job in each department, and cost for setup due to at least one of shift crossing and job splitting,
 wherein the cost for each of a container equivalent that is not completed in a selected scheduling horizon is represented in the objective function by the expression $$\sum_{k=1}^{n} P_2 \frac{C_k}{B_k} \left( B_k - \sum_{j \in R} \sum_{i=1}^{r} Y_{ikj} \right)$$

wherein $P_2$ is a cost of shipping by an alternative mode of transportation, i is a shift index number from 1 to r, j is a department index number from 1 to m, k is a job index number from 1 to n, $C_k$ is a number of containers to be generated by job k, $B_k$ is a number of pieces to be shipped in job k, $Y_{ikj}$ is a number of pieces of job k shipped during shift i in department j, and R is a set of picking and processing departments other than merging or sorting departments.

2. The scheduling model system of claim 1, wherein the cost to ship containers in at least one of consolidated and unconsolidated forms is represented in the objective function by the expression $$P_1 \sum_{k=1}^{n} \sum_{i=1}^{r} X_{i,k,j1} + P_1 \sum_{k=1}^{n} \sum_{i=1}^{r} \sum_{j \in j2} \overline{X}_{i,k,j}$$

wherein $P_1$ is a shipping cost per container, i is a shift index number from 1 to r, j is a department index number from 1 to m, k is a job index number from 1 to n, $X_{i,k,j1}$ is a number of containers of job k processed in a selected merge department j1 during shift i, $\overline{X}_{i,k,j}$ is a number of containers of job k diverted direct to shipping from department j during shift i, and j2 is a subset of departments including the selected departments.

3. The scheduling model system of claim 1, wherein the cost to process each job in each department is represented in the objective function by the expression $$\sum_{j \in R} \sum_{k=1}^{n} \sum_{i=1}^{r} (d_{kj} Y_{ikj}).$$

wherein i is a shift index number from 1 to r, j is a department index number from 1 to m, k is a job index number from 1 to n, $Y_{ikj}$ is a number of pieces of job k shipped during shift i in department j, $d_{kj}$ is a unit cost to process job k in department j, and R is a set of picking and processing departments other than merging or sorting departments.

4. The scheduling model system of claim 1, wherein the cost for setup due to at least one of shift crossing and job splitting is represented in the objective function by the expression $$P_3 \sum_{k=1}^{n} \sum_{i=1}^{r} M_{ik}$$

wherein $P_3$ is a setup cost accounting for labor needed to switch between jobs or shifts, i is a shift index number from 1 to r, k is a job index number from 1 to n, and $M_{ik}$ is equal to 1 if job k is processed in shift i, and is equal to 0 if job k is not processed in shift i.

5. A method of scheduling discrete jobs for shipment from multiple departments which share finite capacity resources, the method comprising the steps of:
 constructing an objective function which comprises a sum of cost to ship containers in at least one of consolidated and unconsolidated forms, cost for each of a container equivalent that is not completed in a selected scheduling horizon, cost to process each job in each department, and cost for setup due to at least one of shift crossing and job splitting;
 loading the objective function into a programmable computer system; and
 programming the computer system to minimize a value of the objective function, and then the computer system minimizing the value of the objective function,
 wherein the objective function constructing step includes representing the cost for each of a container equivalent that is not completed in a selected scheduling horizon by the expression $$\sum_{k=1}^{n} P_2 \frac{C_k}{B_k} \left( B_k - \sum_{j \in R} \sum_{i=1}^{r} Y_{ikj} \right)$$

wherein $P_2$ is a cost of shipping by an alternative mode of transportation, i is a shift index number from 1 to r, j is a department index number from 1 to m, k is a job index number from 1 to n, $C_k$ is a number of containers to be generated by job k, $B_k$ is a number of pieces to be shipped in job k, $Y_{ikj}$ is a number of pieces of job k shipped during shift i in department j, and R is a set of picking and processing departments other than merging or sorting departments.

6. The method of claim 5, wherein the objective function constructing step includes representing the cost to ship containers in at least one of consolidated and unconsolidated forms by the expression $$P_1 \sum_{k=1}^{n} \sum_{i=1}^{r} X_{i,k,j1} + P_1 \sum_{k=1}^{n} \sum_{i=1}^{r} \sum_{j \in j2} \overline{X}_{i,k,j}$$

wherein $P_1$ is a shipping cost per container, i is a shift index number from 1 to r, j is a department index number from 1 to m, k is a job index number from 1 to n, $X_{i,k,j1}$ is a number of containers of job k processed in a selected merge department j1 during shift i, $\overline{X}_{i,k,j}$ is a number of containers of job k diverted direct to shipping from department j during shift i, and j2 is a subset of departments including the selected departments.

7. The method of claim 5, wherein the objective function constructing step includes representing the cost to process each job in each department by the expression $$\sum_{j \in R} \sum_{k=1}^{n} \sum_{i=1}^{r} (d_{kj} Y_{ikj})$$

wherein i is a shift index number from 1 to r, j is a department index number from 1 to m, k is a job index number from 1 to n, $Y_{ikj}$ is a number of pieces of job k shipped during shift i in department j, $d_{kj}$ is a unit cost to process job k in department j, and R is a set of picking and processing departments other than merging or sorting departments.

8. The method of claim 5, wherein the objective function constructing step includes representing the cost for setup due to at least one of shift crossing and job splitting by the expression $$P_3 \sum_{k=1}^{n} \sum_{i=1}^{r} M_{ik}$$

wherein $P_3$ is a setup cost accounting for labor needed to switch between jobs or shifts, i is a shift index number from 1 to r, k is a job index number from 1 to n, and $M_{ik}$ is equal to 1 if job k is processed in shift i, and is equal to 0 if job k is not processed in shift i.

* * * * *

UNITED STATES PATENT AND TRADEMARK OFFICE
CERTIFICATE OF CORRECTION

| | | |
|---|---|---|
| PATENT NO. | : 8,117,052 B2 | Page 1 of 1 |
| APPLICATION NO. | : 11/866484 | |
| DATED | : February 14, 2012 | |
| INVENTOR(S) | : Casey H. Chung and Chelliah Sriskandarajah | |

It is certified that error appears in the above-identified patent and that said Letters Patent is hereby corrected as shown below:

Column 45, line 17, cancel "model" and insert in place thereof -- system --.

Signed and Sealed this
Thirtieth Day of October, 2012

David J. Kappos
*Director of the United States Patent and Trademark Office*